United States Patent [19]

Wolf

[11] Patent Number: 4,799,149

[45] Date of Patent: Jan. 17, 1989

[54] HYBRID ASSOCIATIVE MEMORY COMPOSED OF A NON-ASSOCIATIVE BASIC STORAGE AND AN ASSOCIATIVE SURFACE, AS WELL AS METHOD FOR SEARCHING AND SORTING DATA STORED IN SUCH A HYBRID ASSOCIATIVE MEMORY

[75] Inventor: Gerhard Wolf, Munich, Fed. Rep. of Germany

[73] Assignee: Siemens Aktiengesellschaft, Berlin and Munich, Fed. Rep. of Germany

[21] Appl. No.: 681,993

[22] PCT Filed: Mar. 29, 1984

[86] PCT No.: PCT/DE84/00072

§ 371 Date: Nov. 15, 1984

§ 102(e) Date: Nov. 15, 1984

[87] PCT Pub. No.: WO84/03970

PCT Pub. Date: Oct. 11, 1984

[30] Foreign Application Priority Data

| Mar. 30, 1983 | [DE] | Fed. Rep. of Germany | 3311665 |
| May 30, 1983 | [DE] | Fed. Rep. of Germany | 3319581 |
| Sep. 23, 1983 | [DE] | Fed. Rep. of Germany | 3334536 |
| Sep. 23, 1983 | [DE] | Fed. Rep. of Germany | 3334515 |

[51] Int. Cl.⁴ .................... G06F 7/02; G06F 12/00
[52] U.S. Cl. .................................................. 364/200
[58] Field of Search ... 364/200 MS File, 900 MS File

[56] References Cited

U.S. PATENT DOCUMENTS

| 3,197,742 | 7/1965 | Rettig et al. | 340/172.5 |
| 3,307,153 | 2/1967 | Bauer | 340/172.5 |
| 3,648,254 | 3/1972 | Beausoleil | 340/172.5 |
| 3,742,460 | 6/1973 | Englund | 364/200 |
| 3,757,312 | 9/1973 | Shore et al. | 364/200 |
| 3,771,139 | 11/1973 | Digby | 364/200 |
| 3,906,455 | 9/1975 | Houston et al. | 364/200 |
| 3,958,222 | 5/1976 | Messina et al. | 364/200 |
| 4,068,305 | 1/1978 | Cutler | 364/200 |
| 4,144,564 | 3/1979 | Lamb | 364/200 |
| 4,145,737 | 3/1979 | Lamb et al. | 364/200 |
| 4,149,262 | 4/1979 | Lamb et al. | 364/900 |
| 4,153,943 | 5/1979 | Anderson | 364/900 |
| 4,163,281 | 7/1979 | Stringa | 364/200 |
| 4,257,110 | 3/1981 | Lamb et al. | 365/49 |
| 4,280,177 | 7/1981 | Schorr et al. | 364/200 |

FOREIGN PATENT DOCUMENTS

| 0047842 | 3/1982 | European Pat. Off. |
| 0048056 | 3/1982 | European Pat. Off. |
| 1424741 | 3/1969 | Fed. Rep. of Germany . |
| 1486214 | 9/1977 | United Kingdom . |
| 1497679 | 1/1978 | United Kingdom . |

OTHER PUBLICATIONS

Proceedings of the Spring Joint Computer Conference—"Unconventional Systems" by Daniel L. Slotnick, 1967, vol. 30, pp. 477–481.

(List continued on next page.)

Primary Examiner—Gareth D. Shaw
Assistant Examiner—Jonathan C. Fairbanks
Attorney, Agent, or Firm—Hill, Van Santen, Steadman & Simpson

[57] ABSTRACT

A hybrid associative memory has a non-associative basic storage and an associative surface. Every data unit individually selectable in the basic storage is subdivided into sub-units, and a logic unit ALV of corresponding working capacity is provided in the associative surface for every sub-unit. In order for either the sub-units of a data unit or the respectively corresponding sub-units of a corresponding plurality of data units to be connected through to the associative surface as a data unit, the storage of the data units in the basic storage is divided into areas. Every area is formed of a plurality of data units corresponding in number to the plurality of sub-units of the data unit. The sub-units of all data units of an area are ordered in offset fashion therein in accordance with a prescribed classification pattern. The access to a data unit is internally controlled via an address re-ordering unit for the row address in the address controller. The re-ordering of the sub-units within the respective data unit, required to produce the required sequence, is controlled by means of corresponding data reordering units.

62 Claims, 20 Drawing Sheets

OTHER PUBLICATIONS

IEEE Transactions on Computers, vol. C-17, No. 8, Aug., 1968, pp. 758-770, "Illiac IV Software and Application Programming" by David J. Kuck.

"Associative Processing for General Purpose Computers Through the Use of Modified Memories", by Harold S. Stone, AFIPS Conference Proceedings, vol. 33, Part Two, Dec., 1968, pp. 949-955.

"Make the Most of Bit-Slice Flexibility and Design High-Performance Processors", Design Engineering—Electronic Design 21, Oct. 11, 1978, pp. 226-234.

"A High-Speed Eight-Bit Microprocessor Slice", by Takayoshi Nakashima et al., 3rd USA-Japan Computer Conference Proceedings, Oct. 10-12, 1978, Session 26-3-1-26-3-5.

"Associative Memory Chips: Fast, Versatile—And Here", Electronics, Aug. 17, 1970, pp. 96-100.

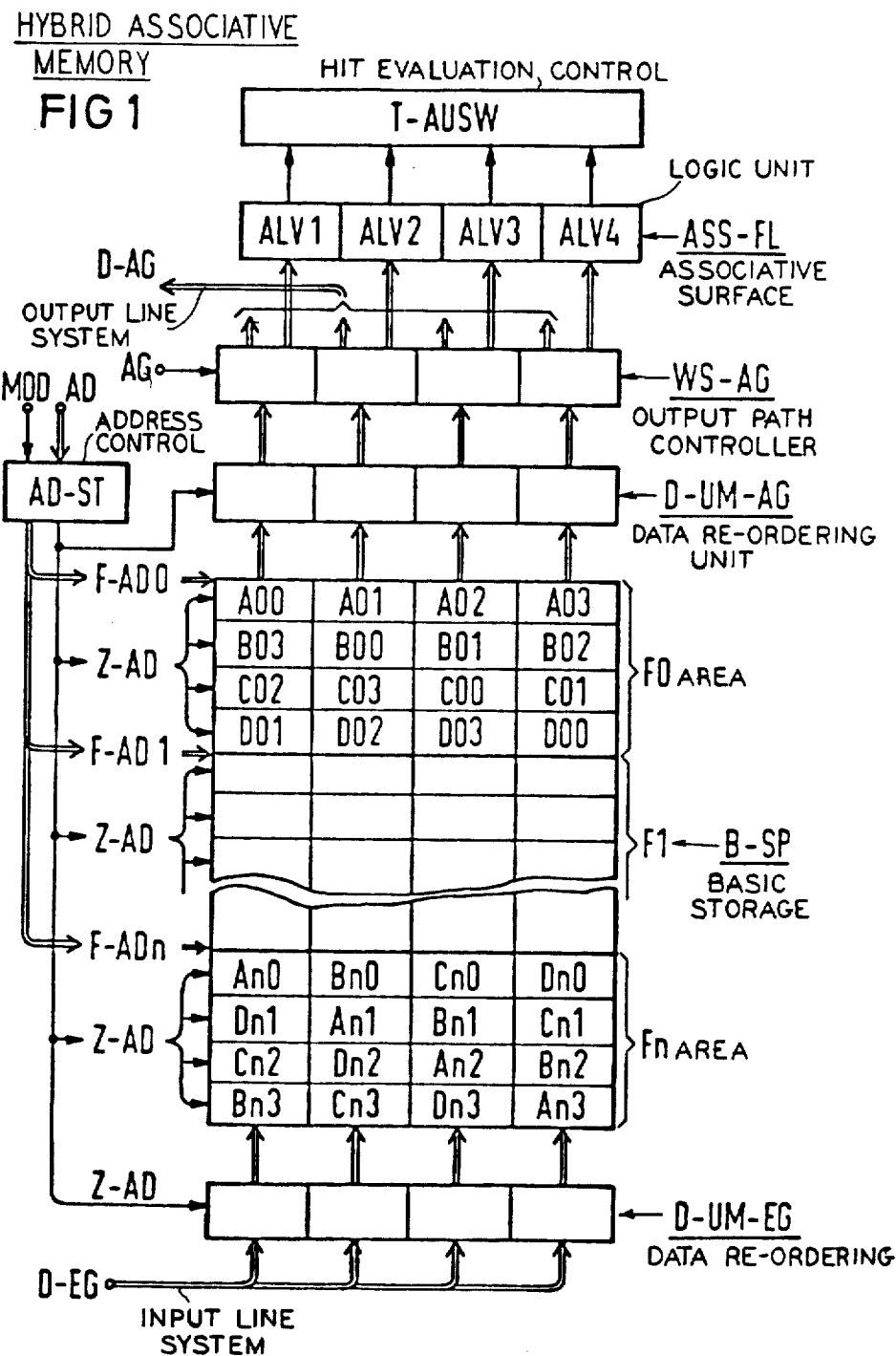

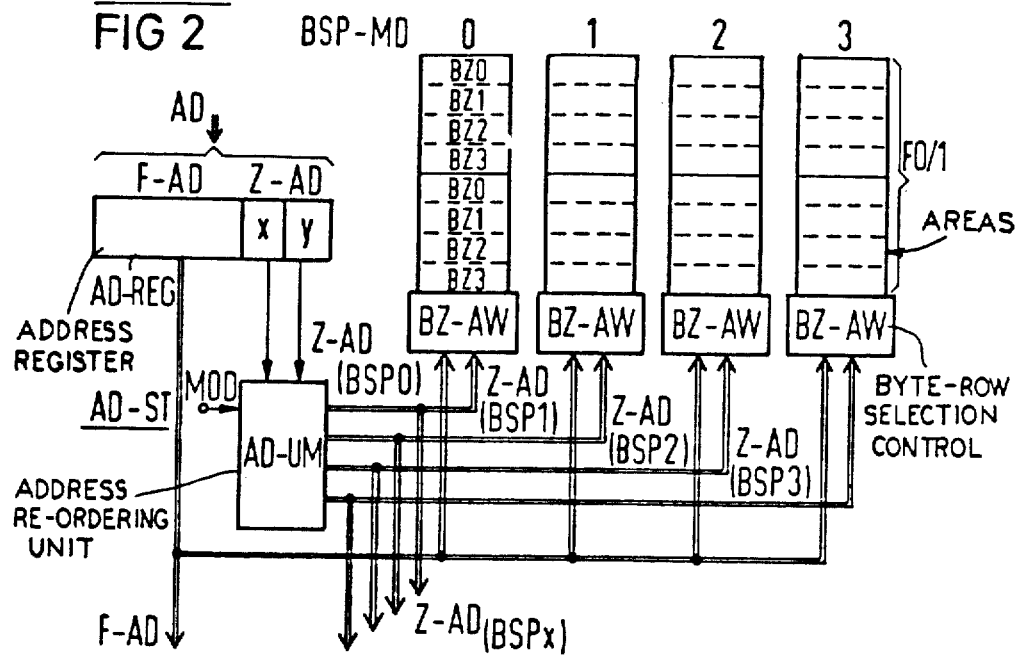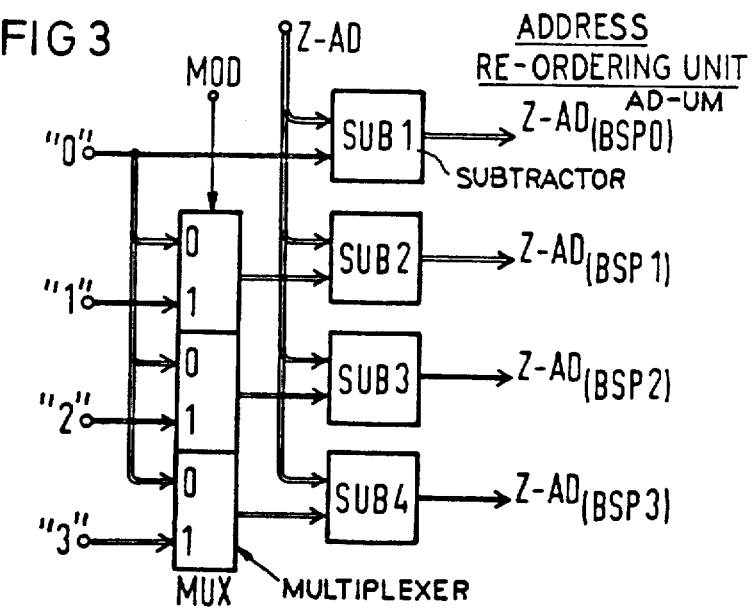

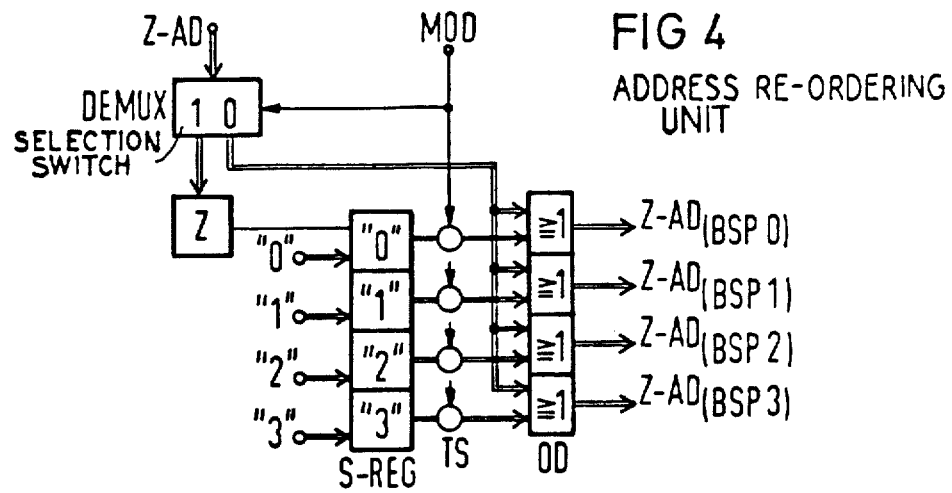
FIG 4 ADDRESS RE-ORDERING UNIT
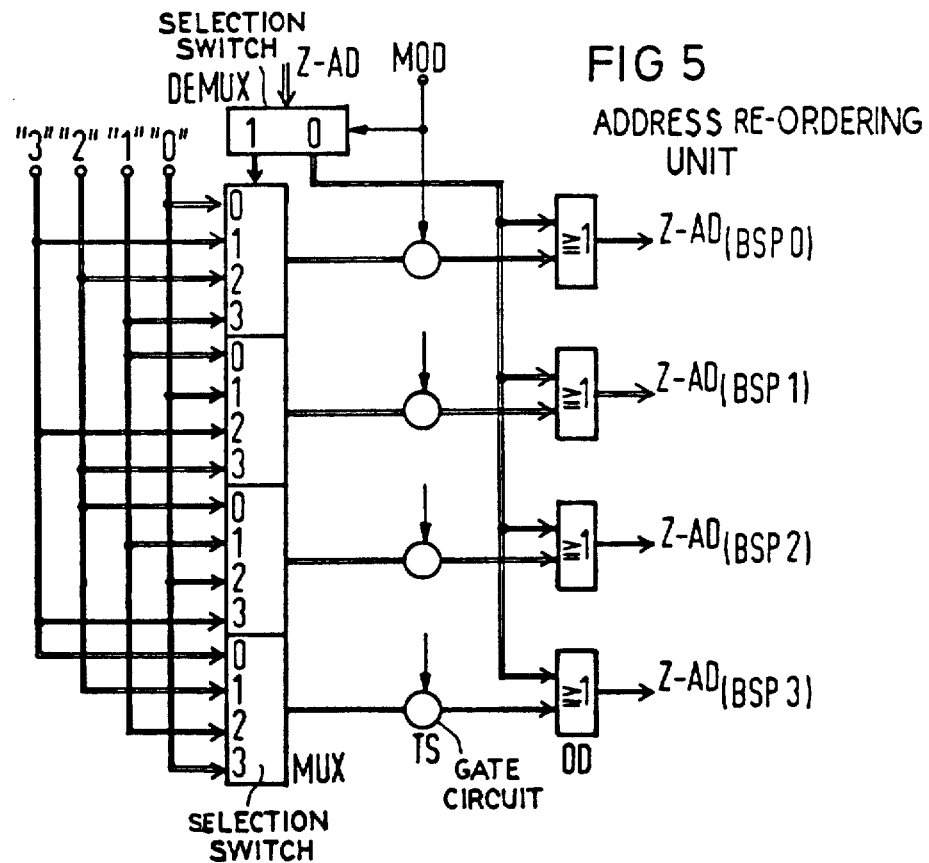
FIG 5 ADDRESS RE-ORDERING UNIT

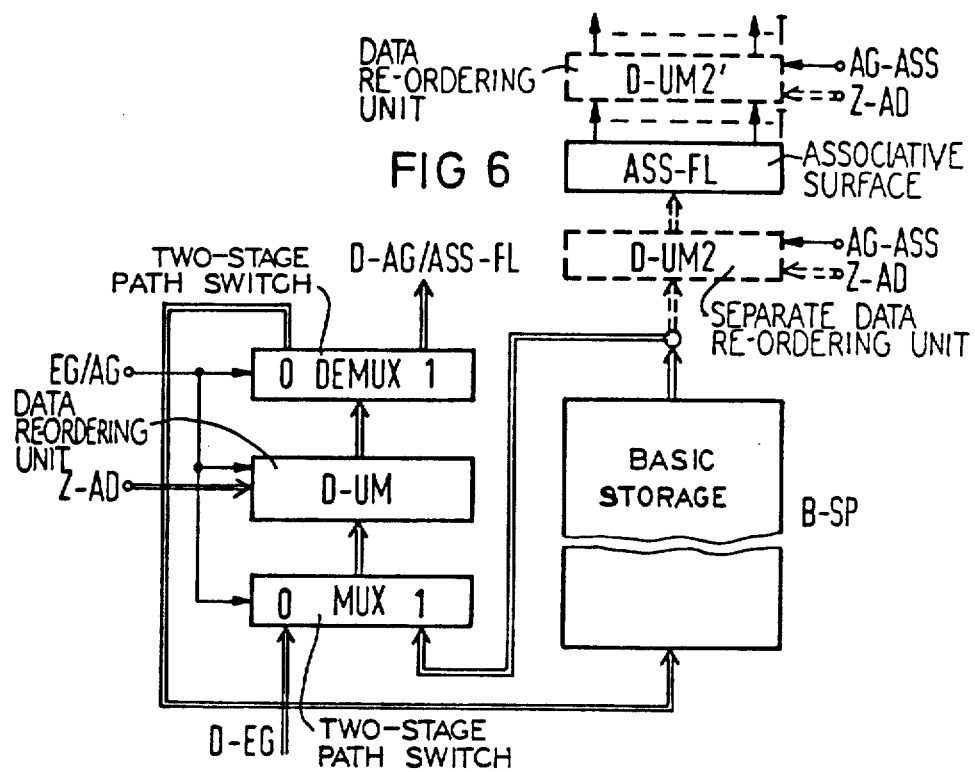
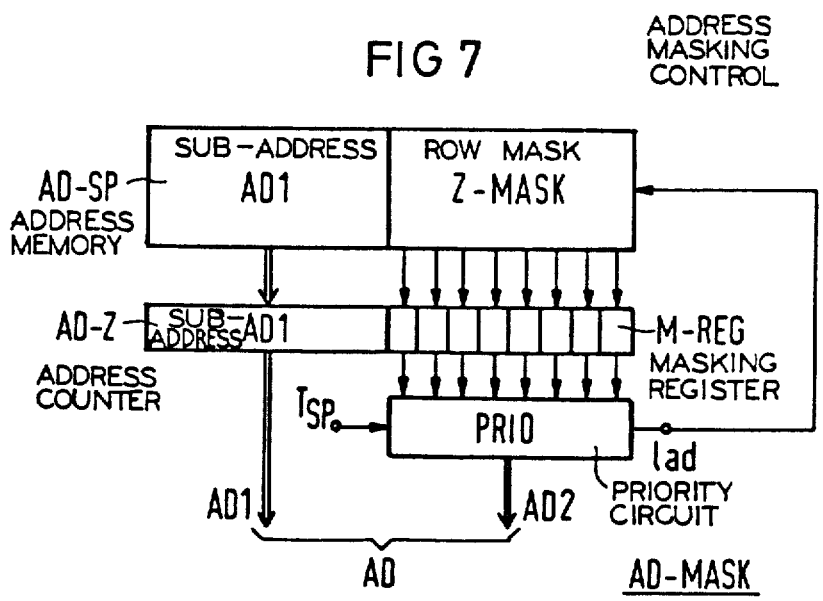

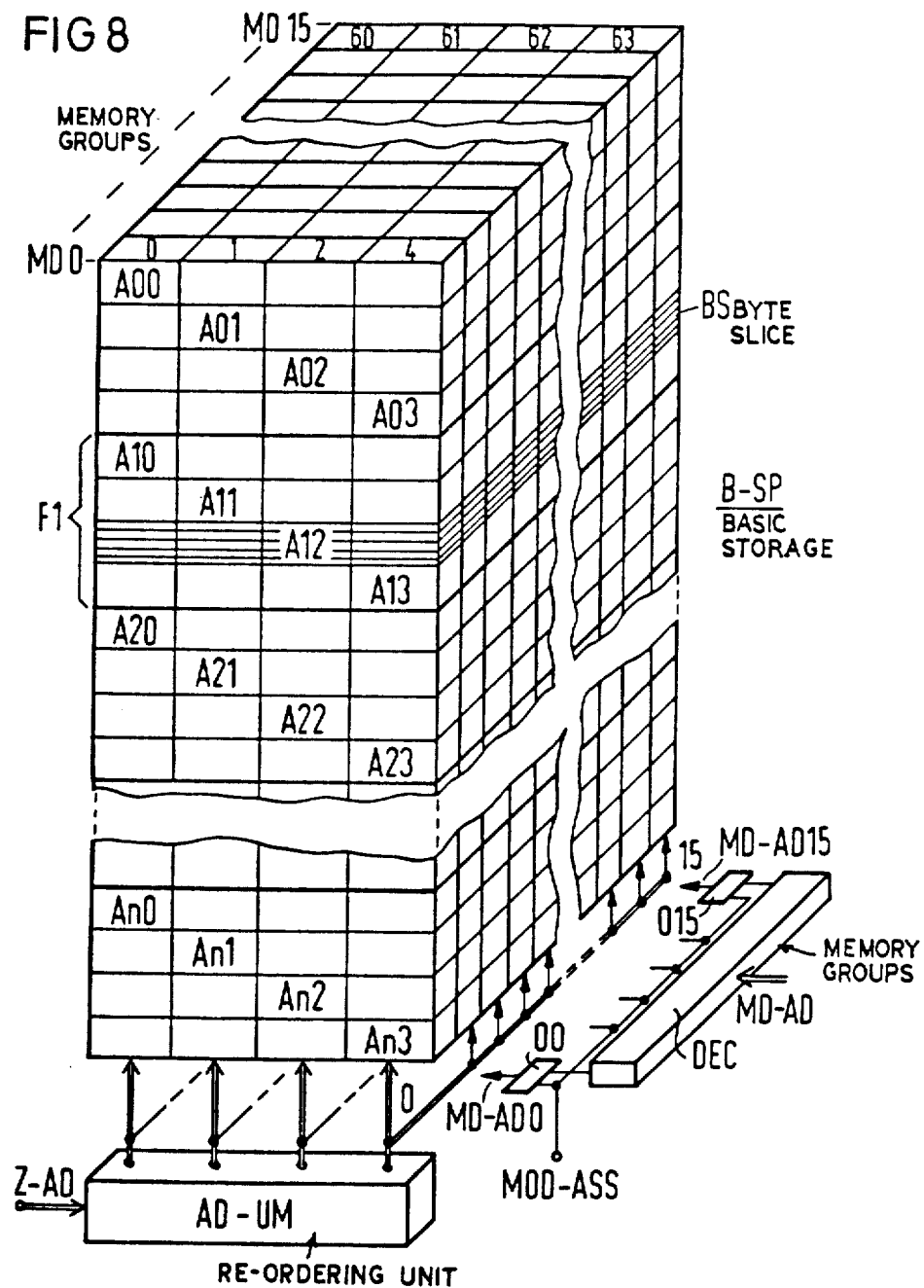

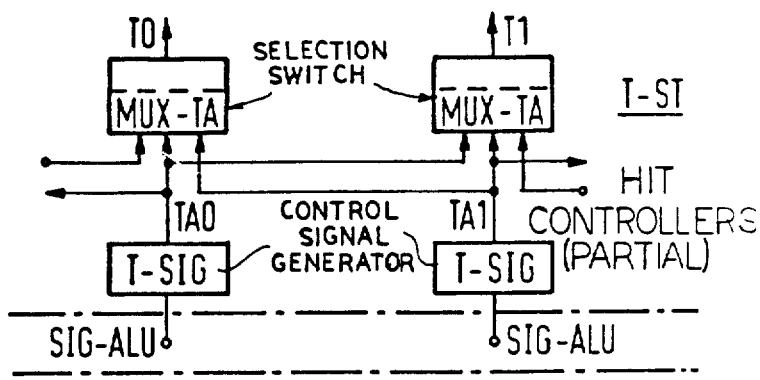
FIG 13
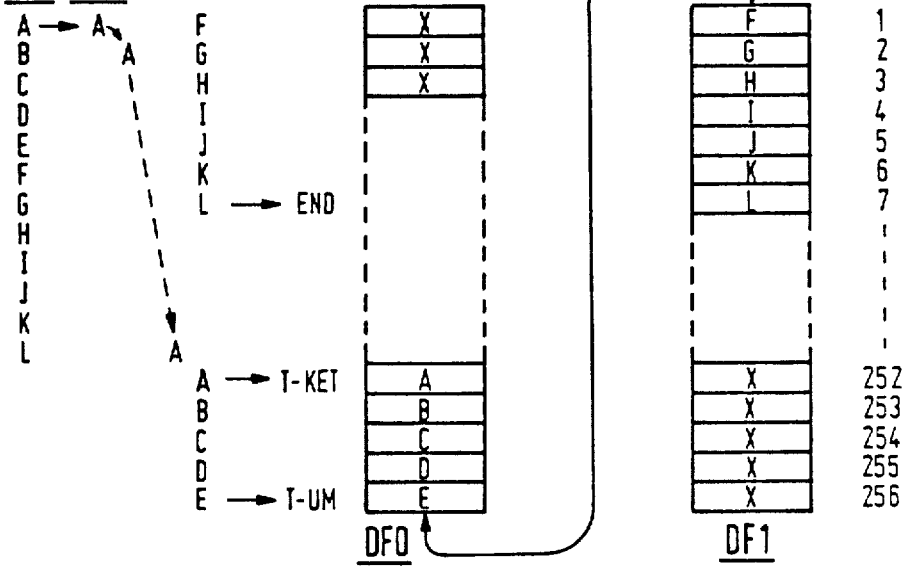
FIG 14
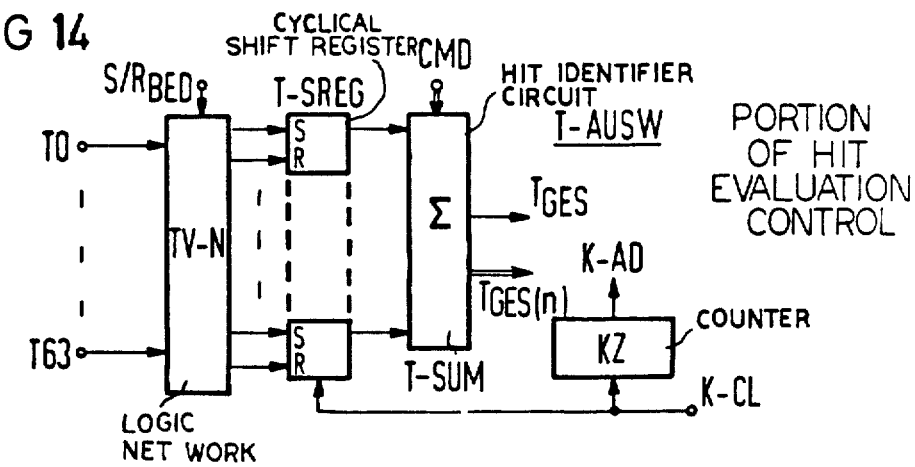

FIG 16

| T = ? | LSB = ? | SBM - | |
|---|---|---|---|
| > 1 | = X | 0 | 1 |
| = 0,1 | = 0 | LSB | LSB |
|  | = 1 | LSB | LSB |

| SBM | LSB | T | SMB - | |
|---|---|---|---|---|
| 0 | 0 | > 1 | 0 | |
| 0 0 | 0 | > 1 | 0 | |
| 0 0 0 | 0 | = 1 | LSB | A |
| 0 0 1 | 1 | = 1 | LSB | B |
| 0 0 | 0 | = 0 | LSB | |
| 0 1 | 1 | = 0 | LSB | |
| 0 | 0 | = 0 | LSB | |
| 1 | 1 | = 1 | LSB | C |

FIG 18A

| AWL | SL | SBM DAT | BG1 BYTE 1 | BG2 BYTE 2 | BYTE 3 | $T_E$ | $T_{GES}$ | |
|---|---|---|---|---|---|---|---|---|
| | 1 | | 0 | | | | >1 | |
| | 2 | | 0 0 | | | | >1 | |
| | 3 | | 0 0 0 | | | | >1 | |
| | 4 | | 0 0 0 0 | | | | >1 | → SBM-SP: BYTE 1 |
| | 5 | 1 | 0 0 0 0 | 0 | | =1 =1 | | → L/AD 11 |
| | | 2 | 0 0 0 0 | | | =0 =1 | | |
| | | 3 | 0 0 0 0 | 0 | | =0 =0 | | |
| | | 4 | 0 0 0 0 | | | =1 =1 | | |
| | | 5 | 0 0 0 0 | 0 | | =1 =1 | | → L/AD 12 |
| | | 6 | 0 0 0 0 | 0 | | =0 | | ⎫ AB |
| | | ↓n | 0 0 0 0 | 0 | | =1 =0 | >1 | |
| | 6 | 1 | 0 0 0 0 | 0 0 | | =1 =1 | | |
| | | 2 | 0 0 0 0 | | | =0 =1 | | |
| | | 3 | 0 0 0 0 | 0 0 | | =0 =0 | | |
| | | 4 | 0 0 0 0 | | | =1 =0 | | |
| | | 5 | 0 0 0 0 | 0 0 | | =1 =0 | | |
| | | 6 | 0 0 0 0 | 0 0 | | =1 =0 | | |
| | | ↓n | 0 0 0 0 | 0 0 | | =1 =0 | =1 | |
| 1 | 1 | | 0 0 0 0 | 0 0 | | =1 =1 | =1 | → AUS 1  `0 0 0 0 1 0 0 ...` |
| | 7 | 1 | 0 0 0 0 | | | A =0 | | |
| | | 2 | 0 0 0 0 | | | =1 =0 | | |
| | | 3 | | 0 1 | | =0 =1 | | |
| | | 4 | 0 0 0 0 | | | =1 =1 | | |
| | | 5 | 0 0 0 0 | 0 1 | | =1 =0 | | |
| | | 6 | 0 0 0 0 | 0 1 | | =0 | | |
| | | ↓n | 0 0 0 0 | 0 1 | | =1 =0 | =1 | |
| 2 | 1 | | | | | A =0 | | |
| | 2 | | 0 0 0 0 | | | | | |
| | ↓5 | | 0 0 0 0 | 0 1 | | =1 =1 | =1 | → AUS 2  `0 0 0 0 0 1 ...` |

FIG 18B

| AWL | SL | SBM DAT | BG1 BYTE 1 | BYTE 2 | BG2 BYTE 3 | $T_E$ | $T_{GES}$ | |
|---|---|---|---|---|---|---|---|---|
| | 8 | 1 | 0 0 0 0 | | | A | | |
| | | 2 | 0 0 0 0 | | | =0 | | |
| | | 3 | | 0 | | =1 | | |
| | | 4 | 0 0 0 0 | | | =0 | | |
| | | 5 | | | | =0 | | |
| | | 6 | 0 0 0 0 | | | A | | |
| | | | | 0 | | =1 | | |
| | | ↓ | | | | =0 | | |
| | | n | 0 0 0 0 | | | =1 | | |
| | | | | 0 | | =0 | =0 | |
| | 9 | 1 | 0 0 0 0 | | | A | | |
| | | 2 | 0 0 0 0 | | | =0 | | |
| | | 3 | | 1 | | =1 | | → L/AD 21 |
| | | 4 | 0 0 0 0 | | | =1 | | |
| | | 5 | | | | =0 | | |
| | | 6 | 0 0 0 0 | | | A | | |
| | | | | 1 | | =1 | | → L/AD 22 |
| | | ↓ | | | | =1 | | AB |
| | | n | 0 0 0 0 | | | =1 | | → L/AD 23 |
| | | | | 1 | | =1 | >1 | |
| | 10 | 1 | 0 0 0 0 | | | A | | |
| | | 2 | 0 0 0 0 | | | =0 | | |
| | | 3 | | 1 0 | | =1 | | |
| | | 4 | 0 0 0 0 | | | =1 | | |
| | | 5 | | | | =0 | | |
| | | 6 | 0 0 0 0 | | | A | | |
| | | | | 1 0 | | =1 | | |
| | | ↓ | | | | =0 | | |
| | | n | 0 0 0 0 | | | =1 | | |
| | | | | 1 0 | | =1 | >1 | AB |
| | 11 | 1 | 0 0 0 0 | | | A | | |
| | | 2 | 0 0 0 0 | | | =0 | | |
| | | 3 | | 1 0 0 | | =1 | | |
| | | 4 | 0 0 0 0 | | | =0 | | |
| | | 5 | | | | =0 | | |
| | | 6 | 0 0 0 0 | | | A | | |
| | | | | 1 0 0 | | =1 | | |
| | | ↓ | | | | =0 | | |
| | | n | 0 0 0 0 | | | =1 | | |
| | | | | 1 0 0 | | =1 | =1 | |
| 3 | | 1 | | | | A | | |
| | | ↓ | | | | | | |
| | | n | 0 0 0 0 | | | =1 | | |
| | | | | 1 0 0 | | =1 | =1 | → AUS 3 |

| 0 0 0 0 | 1 0 0 ... |

FIG 18C

| AWL | SL | SBM DRT | BG1 BYTE 1 | BYTE 2 | BG2 BYTE 3 | $T_E$ | $T_{GES}$ |
|---|---|---|---|---|---|---|---|
| | 12 | 1 | 0 0 0 0 | | | A | |
| | | 2 | 0 0 0 0 | | | = 0 | |
| | | 3 | | 1 0 1 | | = 1 | |
| | | 4 | 0 0 0 0 | | | = 1 | |
| | | 5 | | | | = 0 | |
| | | 6 | 0 0 0 0 | | | A | |
| | | | | 1 0 1 | | = 1 | |
| | | ↕n | | | | = 0 | |
| | | | | | | A | = 1 |
| 4 | | 1 | 0 0 0 0 | | | A | |
| | | 2 | 0 0 0 0 | | | = 0 | |
| | | 3 | | 1 0 1 | | = 1 | |
| | | | | | | = 1 | = 1 |
| | 13 | 1 | 0 0 0 0 | | | A | |
| | | 2 | | | | = 0 | |
| | | 3 | 0 0 0 0 | | | A | |
| | | 4 | | | | = 0 | |
| | | 5 | 0 0 0 0 | | | A | |
| | | 6 | | 1 0 | | = 1 | |
| | | ↕n | | | | = 0 | |
| | | | | | | A | = 0 |
| | 14 | 1 | 0 0 0 0 | | | A | |
| | | 2 | | | | = 0 | |
| | | 3 | 0 0 0 0 | | | A | |
| | | 4 | | | | = 0 | |
| | | 5 | 0 0 0 0 | | | A | |
| | | 6 | | 1 1 | | = 1 | |
| | | ↕n | | | | = 1 | |
| | | | | | | A | = 1 |
| 5 | | 1 | | | | A | |
| | | ↕6 | 0 0 0 0 | 1 1 | | = 1 | |
| | | | | | | = 1 | = 1 |

→ AUS 4  
| 0 0 0 0 | 1 0 1 ... |

→ AUS 5  
| 0 0 0 0 | 1 1 ... |

FIG 20

```
            BG1    BG2    BG3
             ↓      ↓      ↓
DAT 1: | 0 0 0 0 | 0 0 0 1 | 0 0 0 0 | 0 0 0 1 |
DAT 2: | 0 0 0 0 | 0 0 0 1 | 0 0 0 1 | 0 0 0 1 |
DAT 3: | 0 0 0 0 | 0 0 0 1 | 0 0 0 1 | 0 0 0 0 |
```

FIG 19A

| AWL | SL | SBM DAT | BG1 BYTE 1 | BYTE 2 | BG2 BYTE 3 | $T_E$ | KG | $T_K$ | $T_{GES}$ | |
|---|---|---|---|---|---|---|---|---|---|---|
| | 1 | | 0 | | | | | | >1 | |
| | 2 | | 0 0 | | | | | | >1 | |
| | 3 | | 0 0 0 | | | | | | >1 | |
| | 4 | | 0 0 0 0 | | | | | | >1 | ← SBM-SP |
| | 5 | 1 | | 0 | | 1 | 1 | 1 | | ← L/AD 11 |
| | | 2 | | 0 | | 0 | 0 | 0 | | |
| | | 3 | | 0 | | 0 | 1 | 0 | | |
| | | 4 | | 0 | | 0 | 0 | 0 | | ← L/AD 12 |
| | | 5 | | 0 | | 1 | 1 | 1 | | ⎱ AB |
| | | 6 | | 0 | | 0 | 1 | 0 | | |
| | | ↓ | | | | | | | | |
| | | n | | 0 | | 0 | 1 | 0 | >1 | |
| | 6 | 1 | | 0 0 | | 1 | 1 | 1 | | |
| | | 2 | | 0 0 | | 1 | 0 | 0 | | |
| | | 3 | | 0 0 | | 0 | 1 | 0 | | |
| | | 4 | | 0 0 | | 0 | 0 | 0 | | |
| | | 5 | | 0 0 | | 0 | 1 | 0 | | |
| | | 6 | | 0 0 | | 0 | 1 | 0 | | |
| | | ↓ | | | | | | | | |
| | | n | | 0 0 | | 0 | 1 | 0 | =1 | |
| 1 | | 1 | | 0 0 | | 1 | 1 | 1 | =1 | ← AUS 1 0 0 0 0 0 0 ... |
| | 7 | 1 | | 0 1 | | A 0 | 0 | 0 | | |
| | | 2 | | 0 1 | | 0 | 1 | 0 | | |
| | | 3 | | 0 1 | | 0 | 0 | 0 | | |
| | | 4 | | 0 1 | | 1 | 1 | 1 | | |
| | | 5 | | 0 1 | | 0 | 1 | 0 | | |
| | | 6 | | 0 1 | | 0 | 1 | 0 | | |
| | | ↓ | | | | | | | | |
| | | n | | 0 1 | | 0 | 1 | 0 | =1 | |
| 2 | | 1 | | | | A | | | | |
| | | ↓ | | | | | | | | |
| | | 5 | | 0 1 | | 1 | 1 | 1 | =1 | ← AUS 2 0 0 0 0 0 1 ... |
| | 8 | 1 | | 0 | | A 0 | 0 | 0 | | |
| | | 2 | | 0 | | 0 | 1 | 0 | | |
| | | 3 | | 0 | | 0 | 0 | 0 | | |
| | | 4 | | 0 | | 0 | 1 | 0 | | |
| | | 5 | | 0 | | A | 0 | 0 | | |
| | | 6 | | 0 | | 0 | 1 | 0 | | |
| | | ↓ | | | | | | | | |
| | | n | | 0 | | 0 | 1 | 0 | =0 | |
| | 9 | 1 | | 1 | | A 0 | 0 | 0 | | |
| | | 2 | | 1 | | 0 | 1 | 1 | | ← L/AD 21 |
| | | 3 | | 1 | | 1 | 0 | 0 | | |
| | | 4 | | 1 | | 1 | 1 | 1 | | ← L/AD 22 |
| | | 5 | | 1 | | A | 0 | 0 | | ⎱ AB |
| | | 6 | | 1 | | 1 | 1 | 1 | | ← L/AD 23 |
| | | ↓ | | | | | | | | |
| | | n | | 1 | | 1 | 1 | 1 | >1 | |

FIG 19B

| AWL | SL | SBM DAT | BYTE 1 | BG 1 BYTE 2 | BG 2 BYTE 3 | T_E | KG | T_K | T_GES | |
|---|---|---|---|---|---|---|---|---|---|---|
| | 10 | 1<br>2<br>3<br>4<br>5<br>6<br>↓<br>n | | 1 0<br>1 0<br>1 0<br>1 0<br>1 0<br>1 0<br>1 0 | | A<br>0<br>1<br>1<br>A<br>0<br>1 | 0<br>1<br>0<br>1<br>1 | 0<br>1<br>0<br>0<br>1 | >1 | ⎫<br>⎬ AB<br>⎭ |
| | 11 | 1<br>2<br>3<br>4<br>5<br>6<br>↓<br>n | | 1 0 0<br>1 0 0<br>1 0 0<br>1 0 0<br>1 0 0<br>1 0 0<br>1 0 0 | | A<br>0<br>0<br>1<br>A<br>0<br>1 | 0<br>1<br>0<br>1<br>1 | 0<br>0<br>0<br>0<br>1 | = 1 | |
| 3 | | 1<br>↓<br>n | | 1 0 0<br>1 0 0 | | A<br>1 | 1 | 1 | = 1 | → AUS 3<br>0 0 0 0 1 0 0 ... |
| | 12 | 1<br>2<br>3<br>4<br>5<br>6<br>↓<br>n | | 1 0 1<br>1 0 1<br>1 0 1<br>1 0 1<br>1 0 1<br>1 0 1<br>1 0 1 | | A<br>0<br>1<br>0<br>A<br>0<br>A | 0<br>1<br>0<br>1 | 0<br>1<br>0<br>0 | = 1 | |
| 4 | | 1<br>2<br>3 | | 1 0 1<br>1 0 1<br>1 0 1 | | A<br>0<br>1 | 0<br>1 | 0<br>1 | = 1 | → AUS 4<br>0 0 0 0 1 0 1 ... |
| | 13 | 1<br>2<br>3<br>4<br>5<br>6<br>↓<br>n | | 1 0<br>1 0<br>1 0<br>1 0<br>1 0<br>1 0<br>1 0 | | A<br>0<br>0<br>A<br>1<br>A<br>0<br>A | 0<br>0<br>1 | 0<br>0<br>0 | = 0 | |
| | 14 | 1<br>2<br>3<br>4<br>5<br>6<br>↓<br>n | | 1 1<br>1 1<br>1 1<br>1 1<br>1 1<br>1 1<br>1 1 | | A<br>0<br>A<br>1<br>A<br>1<br>A | 0<br>0<br>1 | 0<br>0<br>1 | = 1 | |
| 5 | | 1<br>↓<br>6 | | 1 1<br>1 1 | | A<br>1 | 1 | 1 | = 1 | → AUS 5<br>0 0 0 0 1 1 ... |

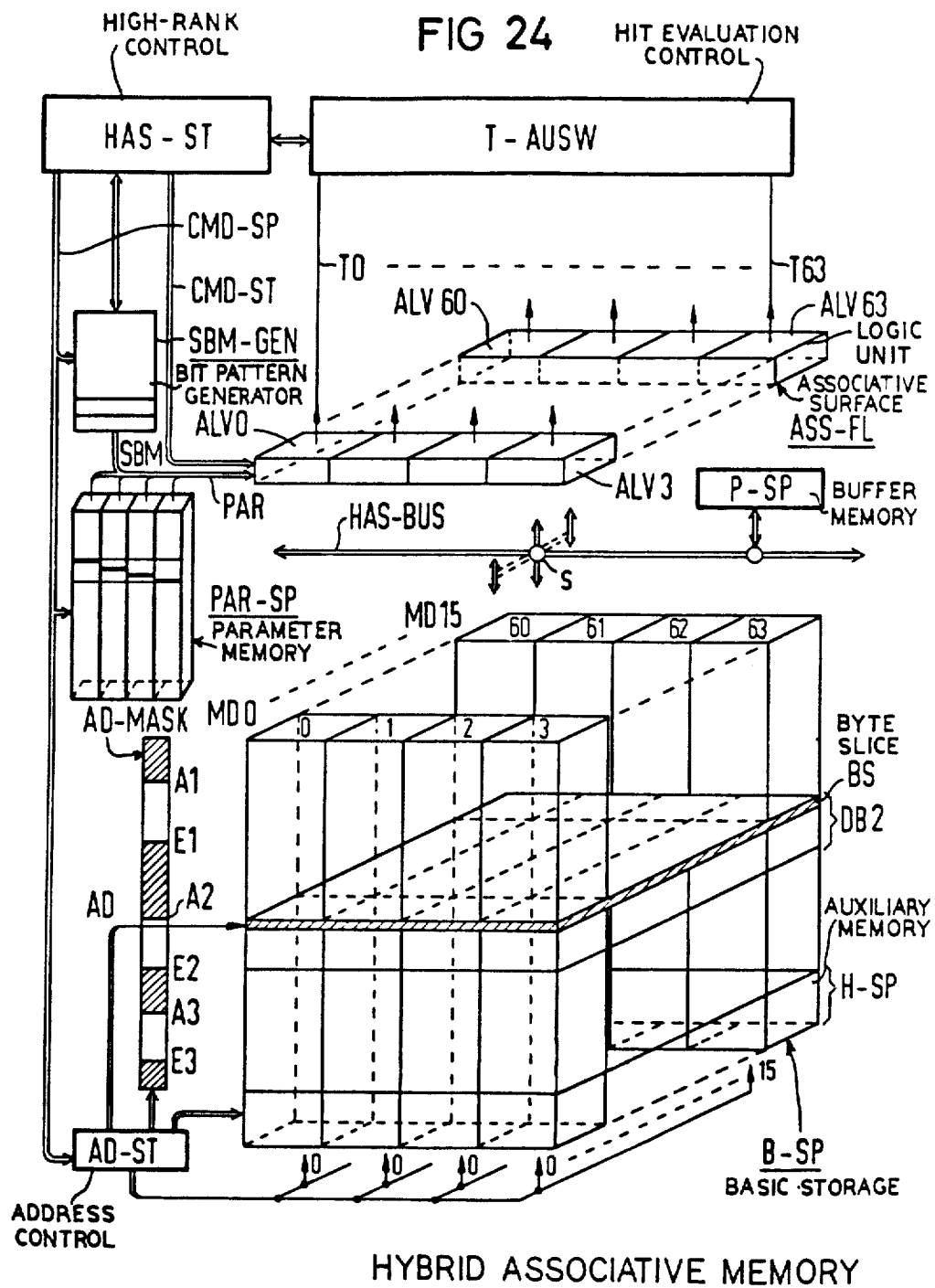

HYBRID ASSOCIATIVE MEMORY COMPOSED OF A NON-ASSOCIATIVE BASIC STORAGE AND AN ASSOCIATIVE SURFACE, AS WELL AS METHOD FOR SEARCHING AND SORTING DATA STORED IN SUCH A HYBRID ASSOCIATIVE MEMORY

The invention relates to a hybrid associative memory composed of a non-associative basic storage and of an associative surface.

Such hybrid associative memories are already known in several embodiments, for example from "Electronics", Aug. 17, 1970, pages 96 through 100; DE-AS No. 25 25 287; "data report" 11 (1976), No. 2, pages 29 through 34, particularly FIG. 3c; European patent application No. EP-A2-0035787; German OS DE-OS No. 32 16 905, where it is stated in the latter that the memory registers of the associative memory cells are loaded from a different memory; and the U.S. Pat. Nos. 3,648,254, 4,145,737, 4,149,262, 4,144,564 and 4,257,110.

The advantage of such hybrid associative memories over pure associative memories particularly consists of the more cost-beneficial storage of great amounts of data which are to be associatively examined in the framework of search and sort procedures.

The capacity of these known arrangements, however, is still not always adequate. Thus, the associative logic units having a work capacity corresponding to the storage capacity only acquire whole memory lines or, respectively, word units. The sub-division of the data units to be processed into sub-units standard in data processing systems, for example as double words of 8 bytes each having eight bits each or as single words of four bytes each having eight bits each, can therefore only be taken into consideration in the associative logic units by means of a corresponding masking, so that a major part of the associative surface can frequently not be used.

Further disadvantages which limit the performance result from the type of logic units forming the associative surface, which can frequently only execute purely comparative functions.

Given the arrangement known from the cited DE-OS No. 32 16 905, the associative memory cells corresponding to the logic units respectively consist of an operation units which is divided into an association unit for the execution of the association relationships and into a following processing unit for the execution of combinational operations given the presence of a hit indicator from the corresponding association unit. The association unit thereby essentially consists of a comparator and, under given conditions, of an exclusive-OR check network with a counter for the identification of a spacing value at the bit level and the processing network consists of an arithmetic-logical unit. Both units, moreover, are maskable, so that selected regions of the respectively ready data unit can be processed as needed.

Such a format of the associative memory cell as a logic unit of an associative surface is, on the one hand, rather involved and, on the other hand, the number of executable association relationships is extremely dependent on the respective format of the separate association unit. Further, the required time expenditure for the execution of various jobs such as, for example, searching on the basis of a search argument that exceeds the work capacity of the logic unit is too great, since a switch to a separate elementary cycle for the processing unit must be undertaken per logic unit given the known arrangement after every association relationship for the hit combination of the partial hit effecting a global hit, insofar as such jobs are even conceived of at all given the known arrangement. This is true since the processing unit only works in hit-dependent fashion based on a previously executed associated relationship.

Finally, the alignment of the data sequences in a vertical or horizontal direction plays a decisive role with respect to the capacity of the hybrid associative memory. The horizontal alignment is generally preferred since it is easier to realize. However, the storage capacity then limits the length of the data sequences if one does not wish to chain a plurality of rows. Since the storing structure and the search and sort procedures to be executed are partially dependent on one another, most of these methods are directed to the horizontal alignment of the data. This is true, for example, for the sorting method known from the German Letters Patent No. 23 42 660 as well or from the afore-mentioned European patent application No. EP-A2-0035787.

SUMMARY OF THE INVENTION

It is therefore an object of the invention to create a hybrid associative memory of the type initially cited
  which, given greater adaptability, has a significantly higher capacity given an associative mode without the properties of a normal access memory (RAM) being thereby lost;
  wherein, given a lower expense for the individual logic units of the associative surface, the scope of executable association relationships is significantly expanded; and
  wherein the precondition for largely independent working of the associative surface is simultaneously opened up in a fashion requiring little time given the execution of various jobs, for example searching or sorting data, as a consequence of a mixing of association relationships to be executed and arbitrary combination functions of an arithmetic or logical nature with a multitude of optionally possible allocations of the individual modules in the logic units;

as well as to design search and sort methods therefor such that
  the boundary conditions prescribed by the new hybrid associative memory are expediently utilized, particularly when searching in non-aligned data, i.e. data not of equal length, and when sorting large amounts of aligned data without a restriction of the individual data sequences.

The starting point for the solution of this object is the new design of the basic storage which takes the sub-division of data to be processed, for example data words, into sub-units, for example bytes, which is standard in data processing systems into consideration and, accordingly, the employment of logic units respectively having only a working capacity corresponding to the sub-units. This creates the pre-condition that the individual sub-units can be checked independently of one another and that the entire remaining word width need not be masked in order to check them. Thus parts of the associative surface are largely blocked for associative relation combinations. Also connected therewith is a mixing of the vertical and horizontal storing which are respectively separately known, said mixing being limited to sub-regions in the form of vertical fields. In combination with a correspondingly designed selection control, it is thereby assured that either all sub-units of a data unit or all mutually corresponding sub-units of all data units of a field can be optionally read or, respectively, written simultaneously, i.e. dependent upon normal or upon associative memory operation. A reordering means in the respective data flow path insures that the proper sequence of the sub-units is respectively restored, or that the reordering required for the storing is undertaken.

Accordingly, the associative surface can simultaneously check both every data unit as such as well as, given full utilization of the associative surface, a corresponding plurality of mutually corresponding sub-units of a plurality of data units, as though, for example, a plurality of data words were stored side-by-side in the form of vertical byte columns.

Further developments relate to the advantageous nature of ordering the sub-units in the basic storage, to the design of individual control devices such as address and data recording units, to the design of the data flow paths, to the modular expansion of the basic module, as well as to additional control measures for further enhancement of the capacity by means of masking the selection control or by means of streaming the data units when loading or emptying the basic storage.

In combination with this new design of the basic storage, the design of the associative surface for the basic storage is also provided according to the invention. The core of each and every logic unit of the associative surface of the new hybrid associative memory is respectively a single arithmetic-logical unit (ALU) in combination with the standard operand and result registers which are optionally employed both for the execution of association relations as well as for the execution of arithmetic and logical combinatorial functions. The hit or, respectively, miss signals in the execution of association relations are thus derived from the indications of the ALU dependent upon the respectively executed association relation.

The expense for the individual logic units is low. On the other hand, the logic units can be employed universally for the greatest variety of jobs. In combination with a feed of individual data sequences in accordance with a vertical alignment in the basic storage, in particular, the individual logic units enable a check with longer search arguments without an additional elementary cycle for the execution of a combination function with the ALU having to be inserted after every executed association relation. On the contrary, the partial hits achieved per character of a data sequence can be directly chained within each logic unit in order to determine a global hit. A single additional flip-flop circuit, for example, suffices therefor, this being consequently reset given a miss and thus, for example, allowing a search sequence to be broken off and a switch to be undertaken to the following search sequence in the framework of a search operation.

Investigations as to similarities, hit weightings and similar functions can be directly undertaken within each logic unit by means of additional elements such as a means for the formation of checksums at the output of the ALU, and by means of inserting additional shift possibilities in the ALU circulation. In particular, an individual or, on the other hand, an externally controlled global bit masking can be undertaken by means of an additional mask register in combination with a mask control per logic unit.

Related to such a hybrid associative memory, search and sort procedures can also be advantageously designed. The method of the invention opens up the possibility that a plurality of vertical data sequences can be simultaneously checked according to a uniform method, so that a dataset prescribed overall by the data sequences can, for example, be more quickly checked. The search operation need then only be broken off when a hit is not indicated for any of the simultaneously checked data sequences. The latter can be monitored in a simple fashion by the hit interpretation which is coupled to the associative surface in the usual fashion. Intervention in the arrangements for the hit chaining are not necessary. All logic units of the associative surface are thereby uniformly supplied with the necessary parameters and the control instructions from one source, for example from a higher-ranking memory control, and are thus globally controlled regardless of whether the hit chainings have already been borken off for some of the data sequences, as long as the hit chaining is still being maintained for at least one of the data sequences.

Chainings of identically long data sub-sequences can also be thereby governed without significant added expense.

With the invention, data of aligned files stored in the basic storage of the hybrid associative memory may be searched. This opens up the possibility of applying the advantageous sorting method known from the German Pat. No. 23 42 660 and, thus, of sorting even large datasets with an acceptable time usage without restriction of the length of the individual data sequences. On the one hand, a restriction to the data which are determinative for the sorting is possible simply by means of exploiting the address control without the capability of the associative surface being restricted as a consequence of the masking of sub-regions. In order, moreover, for faultless results to be obtained given sorting bit patterns that go beyond the working capacity of the individual logic units of the associative surface, complete characters or bytes of the sorting bit pattern are intermediately stored and auxiliary measures are executed for the production of hit chainings for successive data characters of a datum and for monitoring the respective chaining conditions. Individual chaining elements per datum can be utilized so that the chaining condition need not always be re-determined first in the framework of an expansion of the sorting bit pattern.

Dependent on the type of chaining elements and their expression, the time usage for the identification of the chaining conditions can be reduced in various fashions given a downward transgression crossing of byte boundaries within the framework of a narrowing of the sorting bit pattern.

Independently thereof, the time usage for the individual search runs can be influenced by means of additional measures in various fashions by means of checking all data with a prescribed sorting bit pattern. These measures may consist of a simultaneous check of several data by separate logic unis of the associative surface, of the abort of a search run after the appearance of a second hit or multiple hit which requires a further search run with expansion of the sorting bit pattern anyway, of flagging data identified by hits and of evaluating only hits of flagged data in the following search run, or limitation of the following search run only to the flagged data. Another measure consists of the employment of an associative auxiliary storage which is expediently integrated into the basic storage of the hybrid associative memory and which accepts the data identified by hits in a search run and consists of a following sorting operation by the associative surface which is restricted to these data.

Dependent on the nature and the scope of the associative functions which can be executed by the hybrid associative memory, the checking of the individual data or, respectively, data characters can be executed in various fashions on the basis of the available sorting bit pattern. The equality between the sorting bit pattern and the corresponding data bits is checked, and the non-relevant bit places of the work capacity available for the execution of the association function are coveredc by a mask and are therefore not considered in the comparison. On the other hand, the mask control for the determination of the respective association region is eliminated in the region of the work capacity and the associative statement "SMALLER THAN/EQUAL TO" in forward incremental sorting or, respectively, "GREATER THAN/EQUAL TO" in reverse or disincremental sorting is evaluated over the entire work capacity. Thus a respective sorting bit pattern is filled out with nothing but "1" or, respecitvley, "0" for the rest of the available work capabity.

The method also allows special functions for searching individual data or, respectively, a prescribed plurality of data having a value lying closest to a prescribed value in a very simple fashion, and also allows the searching of data having the highest or the lowest value or, respectively, the n highest or lowest values, within a dataset.

Let the invention be explained in greater detail below with reference to illustrative embodiments shown in the drawing.

BRIEF DESCRIPTION OF THE DRAWINGS

FIG. 1 is a fundamental circuit diagram of the hybrid associative memory of the invention comprising only one memory group for the basic storage;

FIG. 2 is a fundamental circuit diagram of the corresponding address control;

FIGS. 3 through 5 are three illustrative embodiments of the address re-ordering unit in the form of fundamental circuit diagrams;

FIG. 6 is a fundamental circuit diagram for the explanation of the insertion of data re-ordering units into the various data flow paths;

FIG. 7 is a fundamental circuit diagram of the address mask control which can be coupled to the address control of FIG. 2;

FIG. 8 is the fundamental format of a basic storage corresponding to FIG. 1 given employment of a plurality of memory groups with a shared address re-ordering unit;

FIG. 13 is a fundamental circuit diagram for explaining the switching for the hit chaining which may become necessary given chained data sub-sequences;

FIG. 14 is an excerpt from the hit evaluation control given execution of hit chaining of chained data subsequences;

FIG. 16 is the change strategy for the sorting bit pattern employed when searching and sorting data;

FIG. 17 is a Table for the development of the sorting bit pattern when sorting three prescribed data in accordance with the change strategy shown in FIG. 16;

FIGS. 18A, 18B, 18C are a flowchart for a sorting operation without employment of individual chaining elements per datum of the data file to be checked;

FIGS. 19A and 19B are a flowchart based on that of FIGS. 18A through 18C given employment of individual chaining elements per datum of the data file to be checked;

FIG. 20 is the comparison of three data for the explanation of the invalidation of the chaining expressions contained in the individual chaining elements given a downward crossing of a byte boundary of the sorting bit pattern;

FIG. 24 is a fundamental circuit diagram of the overall structure of a hybrid associative memory for large datasets based on the components shown in the other FIGS.

DESCRIPTION OF THE PREFERRED EMBODIMENTS

Figure 9:
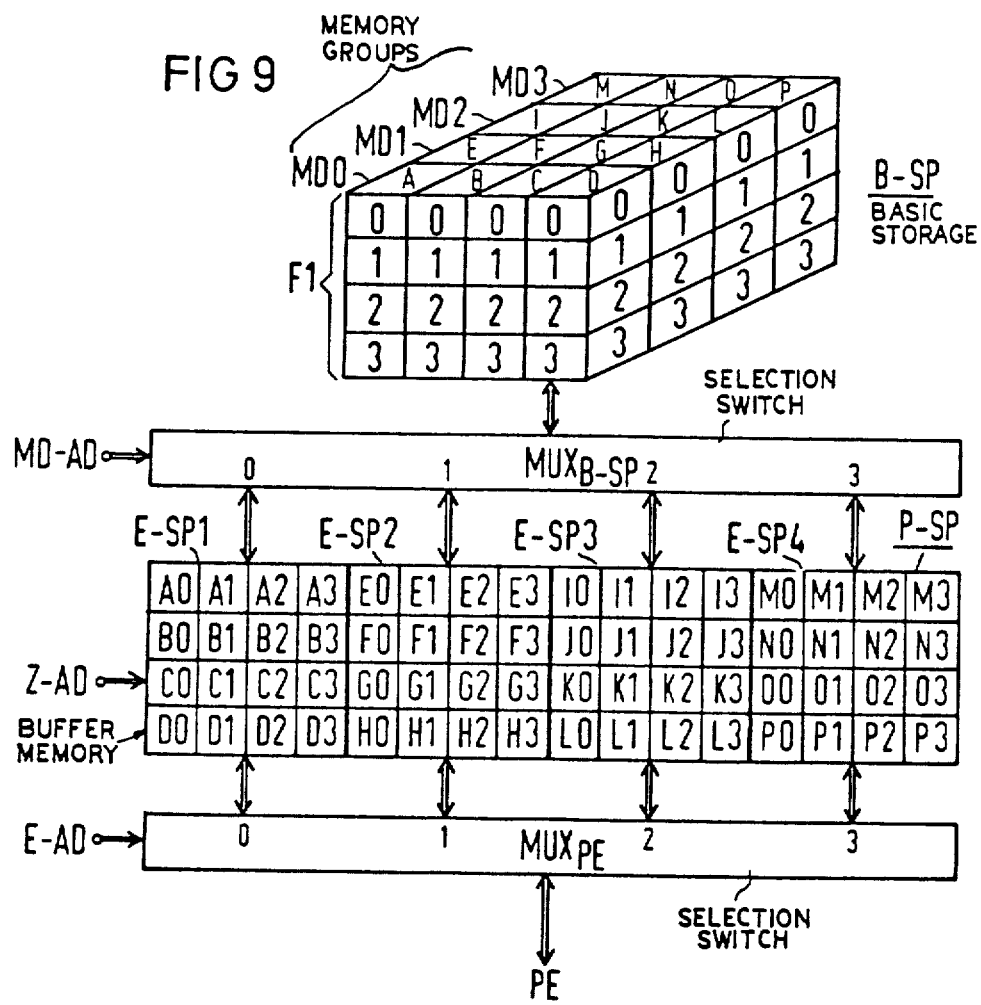
FIG. 9 is the coupling of a buffer memory to the basic storage of FIG. 8 in a fundamental illustration.

The hybrid associative memory shown in FIG. 1 divides in a traditional fashion into a normal access memory as basic storage B-SP and an associative surface ASS-FL comprising a hit evaluation control T-AUSW.

The basic storage B-SP has a working capacity corresponding to one data unit, whereby the data units are writable and readable in column-like fashion relative to one another in traditional fashion and each memory line is individually selectable for the selection of a data unit. Each data unit is sub-divided into sub-units; in the present case, words having 4 bytes each of 8 bits each form the basis as data units. Dependent on the working capacity of the connected data circuit system, they can also be double words comprising 8 bytes each.

The basic storage B-SP is accordingly organized in a corresponding plurality of vertical byte columns which are simultaneously selected by a row-oriented access address AD given the selection of a data unit or of a word, for example the data unit AOi comprising the 4 bytes AO0, AO1, AO2, AO3 in the first memory row.

For reasons yet to be explained, however, the individual words are not arranged in the same fashion in the individual memory rows. Rather, the arrangement follows a prescribed classification pattern in accordance with which it is possible, given a memory access, to either read out the four bytes of a word in traditional fashion or, on the other hand, to read out the mutually corresponding bytes of a plurality of vertically successive words simultaneously in the form of one word.

In accordance with the selected four bytes in every memory row, a corresponding plurality of data units or words therefore form a respective memory area, for example the words AOi,BOi,COi and DOi for the area F0, which is selectable by means of an area address part F−AD=0 within the access address AD. From memory row to memory row, thus, the mutually corresponding bytes of all words in the area, i.e., for example, AO0, BO0, CO0 and DO0 for the field F0, are arranged in cyclically offset fashion by one byte, so that the mutually corresponding bytes of all words in the area respectively lie on a diagonal, whereby the individual diagonals cyclically circulate.

In order for the traditional access mechanism to the individual data units in the individual data unit levels or memory rows to nonetheless be maintained toward the outside, a re-ordering within the address control AD-ST is required for the row address part Z-AD as a further component of the access address in addition to the area address part F-AD, in that every byte column of the area is separately selected with a separate row address. This can be realized without difficulty when discrete memory modules are employed for the individual byte columns, this being unavoidable anyway for a basic storage B-SP having a greater memory capacity.

FIG. 2 shows the fundamental format of a double area F0/1 in the basic storge comprising four memory modules as byte column modules BSP-MD0 through BSP-MD3. Each of these modules has a capacity of, for example, eight bytes which are organized in two groups of four byte rows BZ0 through BZ3 each, and every module is connected to a byte row selection control BZ-AW via which the selection given reading or writing of a byte ensues. When the four bytes forming one word lie in one data unit level, for example in the byte row BZ0, then all memory modules BSP-MD . . . are supplied with the same row address Z-AD$_{(BSP...)}$. When, however, the bytes forming a word lies diagonally offset in different data unit levels, then all memory modules receive different row addresses Z-AD$_{(BSP0)}$ through Z-AD$_{(BSP3)}$, whereby the group selection per memory module in both cases is controlled by means of the whole or a part of the area address F-AD.

Given the selected illustrative embodiment, two bits, namely X and Y, which form the row address Z-AD in the area suffice in order to discriminate the four memory rows respectively forming one memory area F . . . in the basic storage B-SP. These row address bits stored in an address register AD-REG together with the area address F-AD are supplied to an address re-ordering unit AD-UM which offers the required single addresses Z-AD$_{(BSP...)}$ dependent on the selected operating mode MOD.

Given the classification pattern deriving from the memory area F0 of the basic storage B-SP in FIG. 1, all bytes forming a data unit lie in one level and, the sequence of the bytes within the individual words is merely cyclically transposed. Particularly given a normal memory mode, all bytes lying in a row are therefore to be respectively selected, this requiring one and the same row selection address Z-AD$_{(BSP...)}$ in FIG. 2, whereas different row addresses Z-AD$_{(BSP0)}$ through Z-AD$_{(BSP3)}$ are to be made available for each byte column when reading or, respectively, writing data units which are composed of the mutually corresponding bytes of all words in the area. They are made available, namely, dependent on that row address part Z-AD of the access address AD which identifies the appertaining corresponding data unit level in the basic storage B-SP.

FIG. 3 shows an address re-ordering unit AD-UM such as can be employed in FIG. 2 in the form of a fundamental circuit diagram. This address re-ordering unit consists of four 2-bit subtractors SUB1 through SUB4 functioning in modulo-4 fashion. The output row address Z-AD is supplied as a subtrahend to this unit. The minuend respectively consists of one of the four possible base addresses "0", "1", "2" or "3". The connection of these addresses is controlled by multiplexers MUX in accordance with the two types of modes MOD. In a normal mode of the basic storage B-SP, the minuend in the form of the base address "0" is the same for all subtractors, so that identical row addresses Z-AD$_{(BSP...)}$ derive for all byte columns. Given the other operating mode, the row address Z-AD is respectively subtracted from one of the possible base addresses, so that four different row addresses Z-AD$_{(BSP0)}$ through Z-AD$_{(BSP3)}$ derive in accordance with the modulo-4 shift. Given a continuous row address Z-AD in the area, the beginning of the data unit thus respectively shifts by one byte width in cyclical succession, as shown in FIG. 1 with reference to the area F0. Adders can also be employed in an analogous fashion instead of the subtractors.

FIG. 4 shows a second illustrative embodiment of the address re-ordering unit AD-UM in FIG. 2 comprising a four-stage shift register S-REG which has one of the usual four base addresses "0", "1", "2" and "3" stored in every stage ascending in rank. Dependent on the output row address Z-AD and the operating mode MOD, the row address Z-AD is conducted via the selection switch DEMUX either directly to all four OR elements OD when the same row is to be selected in all byte columns or, on the other hand, the content of the shift register S-REG is respectively shifted cyclically in the one or other direction via the shift controller Z in accordance with the value of the row address Z-AD, and the output of the shift register are enabled via the gate circuit TS.

A third illustrative embodiment of the address re-ordering unit AD-UM in FIG. 2 is shown, finally, in FIG. 5. In comparison to that of FIG. 4, the shift register S-REG is replaced by four selection switches MUX comprising respectively four input groups for the four different base addresses "0", "1", "2" and "3". Dependent on the effective output row address Z-AD, one of the four base addresses is connected through to the output in each of the selection switches MUX, whereby the allocation of the base addresses is selected in accordance with the respective classification pattern.

All three of the embodiments of the address re-ordering unit AD-UM which have been described are a matter of fundamental circuit diagrams wherein, with the exception of the operating mode signal MOD, all control paths in the present case respectively comprise two leads for the representation of two-place binary numbers. Given employment of data units in the form of double words having eight bytes and a corresponding eight rows in the area, the control paths would consist of three leads which are to be respectively connected through.

The classification pattern on which the area Fn of the basic storage B-SP in FIG. 1 is based operates according to the inverse principle in comparison to that of the area F0, i.e., the bytes, for example An0,An1,An2 and An3 respectively forming a data unit during the normal mode are respectively disposed in the diagonal, whereas the mutually corresponding bytes, for example An0, Bn0, and Dn0 respectively lie in one level. The address re-ordering units AD-UM explained with reference to FIGS. 3 through 5 can therefore be employed in the same fashion for this re-ordering strategy; the operating mode signals MOD are merely to be transposed.

From the viewpoint of the user, the selection between the two classification patterns for the basic storage B-SP does not make any difference. Given a constant row address part and area address part of the access address AD stepped one-ahead, both classification patterns effect the formation of strings of interrelated data units, for example A0i through Ani, with serial succession of the individual bytes along the vertical access direction for the basic storage. Four parallel data strings, namely A01 through Ani, B0i through Bni, C0i through Cni, and D0i through Dni, can be formed in the present case in accordance with the plurality of bytes in a data level. This becomes particularly clear given the classification pattern for the area Fn in FIG. 1 when one takes the first row of this area as the starting point and also bases the area F0 on the same classification pattern. Such a string formation opens up various possibilities of classifying datasets composed of many data units in the basic storage, namely the formation of a dataset by means of only one such string, so that four different datasets can be simultaneously checked by the associative surface ASS-FL in the present case. On the other hand, the distribution of a dataset to the parallel strings may be accomplished by means of a series connection of the parallel strings in a prescribed memory region of the basic storage, so that parts of the dataset can be checked in parallel, and thus the dataset can be more quickly checked as such.

As the classification patterns of Areas F0 and Fn in FIG. 1 show, the proper byte sequence, for example A00, A01, A02, A03 or, respectively, An0, Bn0, Cn0, Dn0 is only respectively observed for the first row of each and every area. This is departed from, however, in the remaining rows of each and every area. In order to nonetheless assure the proper byte sequence for these characters in the area, however, the data units are conducted via re-ordering means D-UM-EG or, respectively, D-UM-AG both given roll-in as well as given roll-out, and the respectively required sequence is produced by means of a cyclical shift of the respective byte series dependent on the row address Z-AD.

The data re-ordering units can be constructed in the same fashion as the address re-ordering units of FIG. 4 or, better, FIG. 5, but with the difference that the bytes to be written or, respectively, read take the place of the basic addresses, and the control on the basis of the operating mode is eliminated. It must also be taken into consideration that a cyclical shift undertaken in the one direction given an input must be compensated by a shift to be undertaken in the opposite direction given an output.

Instead of multi-stage multiplexers, multi-stage demultiplexers with a corresponding plurality of output groups can also be employed per sub-unit, and the output groups which respectively correspond to one another can be combined via OR elements.

Given operation of the basic storage B-SP according to FIG. 1, all data units are first conducted by the input line system D-EG via a data reordering unit D-UM-EG which produces the required byte sequence in accordance with the selected classification pattern dependent on the pending row address Z-AD. The byte sequence prepared in such fasion is then rolled into the selected area F . . . in the basic storage B-SP upon collaboration of the address re-ordering unit AD-UM in the address control AD-ST. Upon readout from the basic storage, the data unit is likewise conducted via a data re-ordering unit D-UM-AG and the required byte sequence is produced. Only then does onwarding of the read data units ensue, namely to the output line system D-AG given a normal memory mode and to the associative surface ASS-FL given the associative mode. This is determined by the output path controller WS-AG on the basis of the control signal AG, said output path controller again being capable of being composed in a simple fashion of two-stage demultiplexers per sub-unit.

Instead of separate data re-ordering units for the input and output, as shown in FIG. 1, a single data re-ordering unit D-UM can also be provided, as shown in FIG. 6. Due to two-stage path switches DEMUX and MUX, the data flow paths are then to be switched dependent on control signals EG/AG for the input or for the output such that these also lead via the the data re-ordering unit D-UM. The shift direction of the data reordering unit must also be prescribed on the basis of the input/output control signal EG/AG so that the data re-ordering unit can work correctly.

Given a basic storage B-SP of the type shown in FIG. 1, the same data re-ordering units D-UM can be utilized independently of the normal or associative memory mode. Separate data re-ordering units, for example D-UM2, can, however, also be provided for the associative mode, this being indicated in FIG. 6 with the dotted data flow arrow to the associative surface ASS-FL at the output of the basic storage B-SP. This shall be discussed again later.

The processing capacity of the hybrid associative memory can be noticeably increased for many applications when an address masking is connected with the address controller AD. Thus, for example, the entire basic storage need not be checked in a vertical direction given a search run. Rather, only a selected region need be checked, and/or every data unit level need not be selected in the selected region, but only specific data unit levels in every area. As a result thereof, the data flow to the associative surface ASS-FL can be designationally restricted to those data in many instances which are required for the associative check operation, so that a check can frequently be performed significantly faster.

Such an address masking control is shown on FIG. 7. It essentially consists of an address counter AD-Z operating in coded fashion for the qualification of a memory region in the basic storage B-SP on the basis of the address part AD1, and of a masking register M-REG comprising a respective bit location per data row in the memory region determined by the address part AD1. The outputs of the masking register M-REG are monitored with a priority circuit PRIO when clocked by a memory cycle clock $T_{SP}$, successively supplies the corresponding, coded sub-address AD2 for each marked input, said sub-address AD2 forming the respective access address AD together with the sub-address AD1. In accordance with the pre-setting of the masking register M-REG, the data rows in the selected memory region of the basic storage can thus be selected successively in arbitrary combination or, respectively, data rows can be excepted from the selection in arbitrary combination. The pre-setting of the address counter AD-Z and of the masking register M-REG ensues from an address memory AD-SP which, when selected with the signal lad, makes the respectively next address entry in the form of the sub-address AD1 and the row mask Z-MASK available after recognition of the last flagged register output by the priority circuit PRIO.

The width of the row mask Z-MASK is expediently selected such that an optimum relationship between memory expense on the one hand and control or, respectively, time usage on the other hand is arrived at for the majority of applications. Under given conditions, work can also be carried out with variable field lengths for the address part AD1 and the mask part Z-MASK.

FIG. 8 shows the expansion of the basic storage B-SP of FIG. 1 having a single memory group to, for example, 16 memory groups MD0 through MD15 which can be arranged following one another in the form of a three-dimensional memory, or side-by-side in the form of a two-dimensional memory, and which are respectively individually selectable. The area and row selection, by contrast, ensues in parallel in the individual memory groups so that—as shown—the expense for the address re-ordering units AD-UM does not increase. The same applies to the data re-ordering units (not shown) when separate re-ordering units are provided for the associative mode, since only one data unit is always being written or read given the normal memory mode.

For the associative mode, however, separate data re-ordering unit is required for every memory group when, in order to boost the performance capability of the hybrid associative memory, a complete byte layer or level BS is respectively simultaneously connected through to a correspondingly large associative surface ASS-FL. The expense for the data re-ordering units, however, can be reduced when, instead of the data bytes, it is the corresponding hit outputs T at the output of the associative surface ASS-FL which are re-ordered, as indicated in FIG. 6. Since every logic unit ALV . . . [sic] of the associative surface ASS-FL comprises only one hit output, the overall expense in comparison to bytes having eight bits each is reduced to one-eighth.

A basic storage B-SP designed in accordance with FIG. 8 is also particularly suited for loading and unloading in a streaming mode when the data are edited such that data units can be successively entered into separate memory groups. This editing ensues by means of a preceding buffer memory.

FIG. 9 shows a corresponding fundamental circuit. For the sake of simplicity, only four memory groups MD0 through MD3 are thereby provided for the basic storage B-SP and only one area Fn is shown, so that a total of 16 vertical strings A through P having 4 bytes each derive in accordance with 16 data units.

One individual memory is provided in the buffer memory P-SP per memory group MD0 through MD3 in the basic storage B-SP, and thus a total of four individual memories E-SP1 through E-SP4 are present. Each individual memory has a capacity in accordance with the plurality of strings or data units per memory group MD . . . . These individual memories are continuously successively loaded via the selection switch MUX$_{PE}$ proceeding from the periphery PE, whereby the row address Z-AD of the individual memories is identical to that of the basic storage B-SP.

As soon as the buffer memory P-SP is full, the data units identified by the respectively same row address Z-AD are successively forwarded from all individual memories E-SP1 through E-SP4 to the corresponding memory groups MD0 through MD3 of the basic storage B-SP. For the first row of all individual memories E-SP1 through E-SP4, these are thus the data units A,E,I and M which are rolled into the basic memory B-SP with the same row address setting. Given an output from the basic storage B-SP, accordingly the individual data units, for example A,E,I and M, are first successively written via the selection switch MUX$_{B-SP}$ into the mutually corresponding memory sections of the individual memories E-SP1 through E-SP4. This progresses from row to row, until the buffer memory P-SP is filled. Given forwarding of the data stored in the buffer memory P-SP to the periphery PE, the individual memories, for example E-SP1, are respectively completely emptied before stepping one ahead to the respectively following individual memory, for example E-SP2.

Instead of individual memories, memory regions of a unified memory can be employed. Likewise, the individual memory sections, for example for the data unit A, can be replaced by memory sections lying below one another which correspond in number to the respective string length. Thus for example, 16 successive data words A0i through A15i forming a string of 64 bytes (and, in the same arrangement, the strings A through P) can be succesively stored.

Entire area layers of the basic storage B-SP can thus be interchanged in the streaming method. The only pre-condition is that the buffer memory P-SP has a working speed matched to the streaming speed, since the basic storage B-SP can work more slowly than the buffer memory P-SP. It can thus be expedient that two buffer memories which function in alternate mode are provided instead of the one buffer memory P-SP shown.

Figure 10:
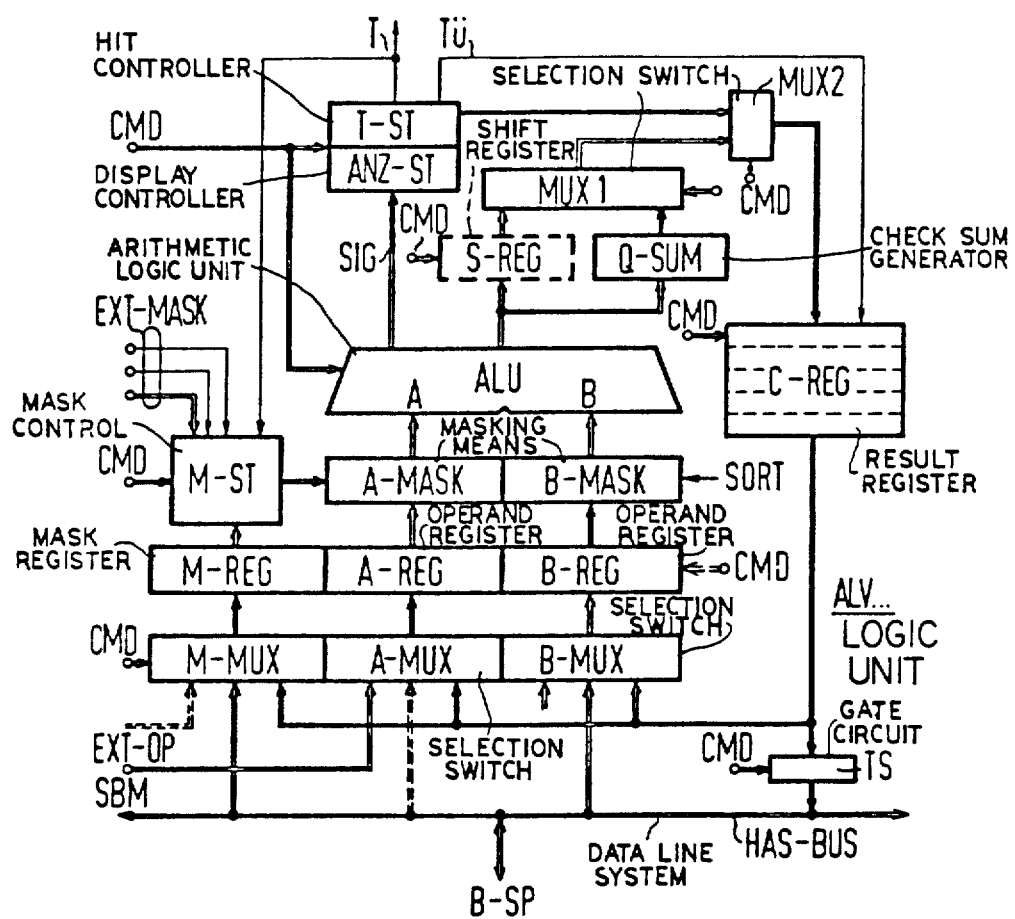
FIG. 10 is the structure of a logic unit as module of the associative surface.

The core of the logic unit ALV shown in FIG. 10 (and of which the associative surface of a hybrid associative memory is composed) is a single aritithmetic-logic unit ALU having the work capacity for one character, which is usually eight bits. The two operand inputs of the ALU are respectively preceded by a masking means A-MASK or, respectively, B-MASK, an operand register A-REG or, respectively, B-REG, and a selection switch A-MUX or, respectively, B-MUX. The two operand registers can be selectively loaded from a plurality of sources via the latter. Let it be presumed in the present case that data are supplied to the register B-REG from the basic storage B-SP of the hybrid associative memory in the majority of use cases, these data to be checked with reference to a search argument SBM made available in the other operand register A-REG. Instead of the argument SBM, external operand EXT-OP can also be supplied to the register A-REG for logic functions to be executed. Furthermore, the operand registers can also be loaded from the result register C-REG of the ALU which expediently consists of a register set comprising, for example, 16 individual registers.

As a rule, the data line systems HAS-BUS of the hybrid asscoiative memory has a data capacity which corresponds to a plurality of characters or bytes, for example four or eight bytes adaptable to the data line systems of data processing systems. Accordingly, the basic storage B-SP respectively offers data units whose width exceeds the working capacity of a logic unit and a corresponding plurality of logic units are then to be connected parallel to the corresponding lines of the data line system HAS-BUS. However, data units can also be supplied to the basic storage B-SP via the data line system HAS-BUS, such as via the gate circuit TS from the result registers C-REG of the connected logic units.

Analogous to the two operand registers A-REG and B-REG, a separate mask register M-REG with a preceding selection switch M-MUX is also provided, this likewise being capable of being loaded from a plurality of sources, for example from the result register C-REG, from the data line system HAS-BUS or from an external source as well.

Furthermore, A mask control M-ST for setting the operand masks A-MASK and B-MASK is coupled to the mask register M-REG. In addition to the mask information from the mask register M-REG, this control can also process directly supplied external mask information EXT-MASK and can consider existing hit signals T. The manner of functioning of this mask control M-ST shall be explained in greater detail later with reference to FIG. 12.

The output of the logic unit ALU is connected parallel to a ring shift register S-REG and to a checksum generator Q-SUM. The separate shift register can be omitted when the operand registers A-REG and B-REG assume this function at the same time. Furthermore, the result signals SIG of the ALU are interpreted by a display controller ANZ-ST for the formation of the standard displays. A hit controller T-ST is coupled to this display controller, said hit controller T-ST, dependent on the respectively existing displays and the respectively executed association relation, determining whether a hit has been achieved or not and how the respective hit result is to be interpreted. Further jobs of the hit controller T-ST shall likewise be explained later with reference to FIG. 11.

Results of the hit controller T-ST, just like the results of the checksum generator Q-SUM, of the ALU or, respectively, of the interposed shift register S-REG, can be forwarded via selection switches MUX1 and MUX2 to the result register C-REG, whereby the acceptance into the result register may, under given conditions, be dependent on the existence of a control signal TU of the hit controller T-ST.

The activation of the individual components of the logic unit and the nature of their activation are determined by control signals CMD of a higher-ranking sequence control. Despite the uniform designation of these signals with CMD, it ought to be clear that this is a matter of different signals on one or more signal lines in order to be able to correspondingly select the individual components in accordance with their function. This is particularly true with respect to the ALU which is to be informed which function is to be respectively executed. Traditional components can be respectively employed overall for the construction of the logic unit, whereby the structure of the mask control M-ST and of the hit controller T-ST follows from the following description with reference to FIG. 11 and FIG. 12. All of these modules or, respectively, components are expediently combined in an integrated circuit in order to obtain the most compact structure possible with the shortest line paths.

Figure 11:
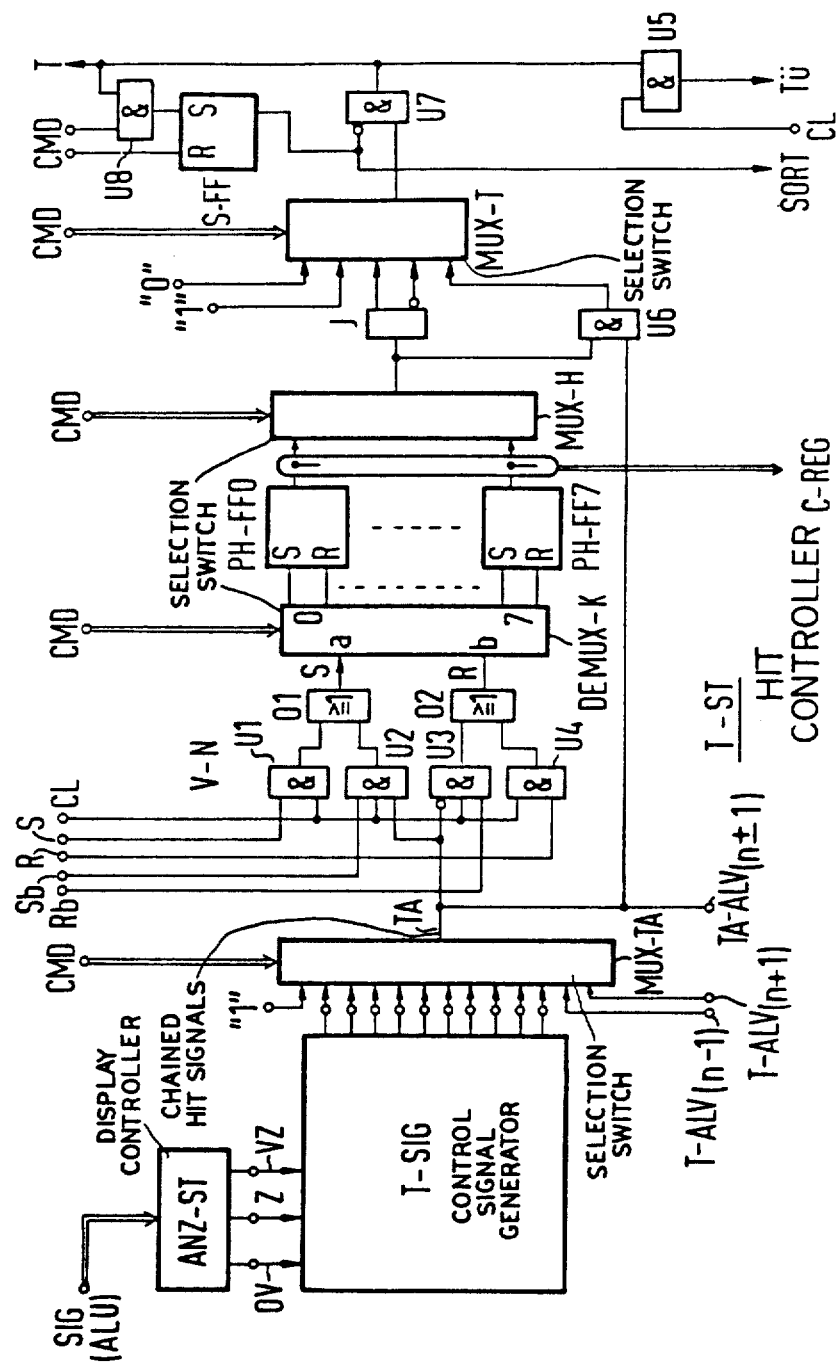
FIG. 11 is the fundamental structure of the hit control of FIG. 10.
Figure 12:
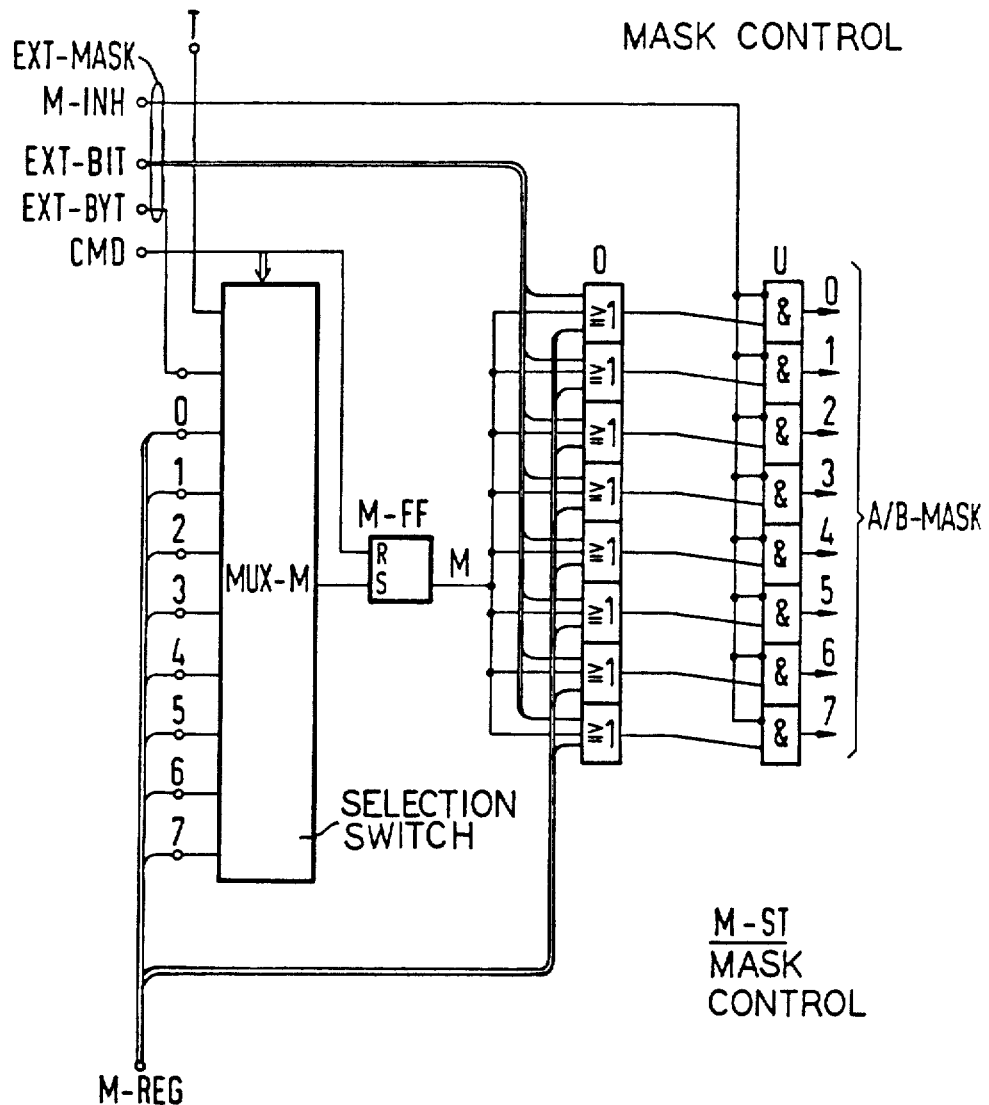
FIG. 12 is the fundamental structure of the mask control of FIG. 10.

Before the plurality of possible applications deriving from such a structure are discussed, the structure of the hit controller T-ST with reference to FIG. 11 and the structure of the mask control M-ST with reference to FIG. 12 shall be discussed.

In the upper left part, FIG. 11 shows the display controller ANZ-ST which determines the required displays from the signals SIG of the ALU in the traditional manner. These, for example, are the displays OV for the overflow, Z for the result zero, and VZ for the operational sign of the combinational result. The hit signals corresponding to the individual association relations are formed fromm these displays, the respectively applicable hit signal being selected from said hit signals with the selection switch MUX-TA and being forwarded as hit display TA. The individual hit signals are formed, for example, in accordance with the following table, whereby the combinations and allocations shown in the table only represent an illustrative example that can be modified as desired.

| No. | Ass. Relation | ALU-CMD | Condition |
|---|---|---|---|
| 1 | B EQUAL TO A | B - A | $Z \& \overline{OV} = 1$ |
| 2 | B UNEQUAL TO A | B - A | $\overline{Z} \& \overline{OV} = 1$ |
| 3 | B GREATER THAN A | B - A | $\overline{Z} \& \overline{V} \& OV = 1$ |
| 4 | B SMALLER THAN A | B - A | $V \& OV = 1$ |
| 5 | B EQUAL TO/GREATER THAN A | B - A | $\overline{V} \& OV = 1$ |
| 6 | B SMALLER THAN/EQUAL TO A | B - A | $(Z \text{ OR } V) \& OV = a$ |
| 7 | B POSITIVE | B or B + 0 | $\overline{V} \& \overline{OV} = 1$ |
| 8 | B NEGATIVE | B or B + 0 | $V \& \overline{OV} = 1$ |
| 9 | B EQUAL TO ZERO | B or B + 0 | $Z \& \overline{OV} = 1$ |
| 10 | OVERFLOW | — | $OV = 1$ |

When the logic condition dependent on the respectively executed assocation relation is met for the displays, then a hit with the signal "1" is indicated on the corresponding output line of the means T-SIG, whereas a miss supplies the signal "0".

Two further inputs of the selection switch MUX-TA can also be connected to the hit outputs of the respectively neighboring, two logic units $ALV_{(n-1)}$ and $ALV_{(n+1)}$. The output of the selection switch MUX-TA for the hit display TA is connected in the same fashion to the corresponding terminals of the neighboring logic devices.

A hit acceptance for maintaining the hit chaining when checking chained data sub-sequences is thus also possible when the search argument covers two chained data sub-sequences.

The hit indication TA determined and selected in such fasion is then not immediately forwarded as hit T but, under given conditions, is modified dependent on boundary conditions corresponding to the respective application. A logic network consisting of the AND elements U1 through U4 and of the OR elements 01 and 02 which supplies set and reset signals S and R, respectively, for a following flip-flop PH-FF is provided for this purpose. In accordance with the work capacity of the logic unit, one flip-flop is provided per bit place in the present case, i.e. a total of the flip-flops PH-FF0 through PH-FF7 (and wherein one of which is selected via the preceding selection switch DEMUX-K). With these flip-flops, thus, partial hits arising when checking data sequences with an argument consisting of a plurality of characters can be chained in a simple fashion and a global hit can be derived therefrom given a fulfilled chaining condition, whereby a chaining of such global hits from sub-divided data sequences is possible over and above this.

In order to be as free as possible in the type of modification with respect to the chaining functions to be executed the hit flip-flops PH-FF . . . can be both unconditionally as well as conditionally set or reset by the logic network. This is enabled by the control signals S and R for the unconditional setting and by the control signals $S_b$ and $R_b$ for the conditional, i.e. for the setting dependent on the respective hit indication TA signals are supplied, like the other signals CMD, from a higher-ranking control.

The hit signals made available by the chaining flip-flops PH-FF0 through PH-FF7 are again individually selectable by means of a following selection switch MUX-H and can be differently evaluated in that, for example, a hit is evaluated as a miss or, on the other hand, as such a hit. The inversion function connected therewith is assumed by the inversion element I. Independently of the actually generated hit signal, a rigidly prescribed signal "0" or "1" can also be evaluated as a hit. The corresponding election and determination is undertaken, in the final analysis, by the selection switch MUX-T dependent on effective control signals CMD, said selection switch supplying the ultimate high signal T which is supplied in a known fashion to the hit evaluation controller—T-AUSW, for example, in FIG. 1—which monitors the hit signals of the associative surface. The acceptance of the respective ALU result or the setting of the chaining flip-flops PH-FF0 through PH-FF7 into the result register C-REG dependent on the setting of the selection switch MUX2 (FIG. 10) can also be made dependent internally on the hit signal T. This is indicated in FIG. 11 by the arrows $T_u$ for the acceptance clock and C-REG for the flip-flop setting.

In order to also be able to fulfill the conditions in the framework of a sorting operation with such a hit controller, the hit indication TA is linked to the output of the selection switch MUX-H by means of the AND element U6 whose output is conducted to a further input of the selection switch MUX-T. A selected hit flip-flop, for example PH-FF0, can therefore be employed as a byte boundary chaining element when, for example, the clock CL supplied to the AND elements U1 through U4 is respectively triggered only when the byte boundary of a sorting bit pattern byte is reached.

The illustrated hit controller T-ST can also be employed in a simple fashion for disabling the corresponding logic unit, for example given data qualified as being sorted out. A flip-flop S-FF which disables the AND element U7 at the output of the selection switch MUX-T is set via the AND element U8 given the presence of an individual hit and of a control signal CMD derived therefrom, for example by a higher-ranking control. The hit controller can thus no longer supply hit signals T to the higher-ranking hit evaluation control T-AUSW. Over and above this, the output signal SORT of the flip-flop S-FF can also be directly supplied to the masking devices A-MASK and B-MASK as a disabling signal, as indicated in FIG. 10, so that the following ALU can no longer process any data due to the general disabling of the two affected data paths. Due to such a blockade of a logic unit ALV, a datum stored, for example, in an auxiliary memory region of the basic storage B-SP is automatically no longer considered in the further course of the sorting operation and is flagged as sorted out in this fashion.

Of course, the blockade of a logic unit ALV can also be achieved in a different way, for example via the setting of the masking register M-REG dependent on the output signal of the AND element U8 of the hit controller T-ST in combination with the following mask controller M-ST.

Such a hit control then functions largely universally.

Further application possibilities over and above this are opened up by the provided mask controller M-ST of FIG. 10 whose structure derives from FIG. 12. Corresponding to the individual bit places of the two masks A-MASK and B-MASK, the mask coontroller M-ST supplies eight individual control signals which are derived from the AND elements U at the output of the mask controller. These AND elements U are controllable via their inverted inputs by a signal M-INH in the frame of an external mask information EXT-MASK in such fashion that the control signals respectively offered via the preceding OR elements O are either inhibited or enabled. Thus the signal "1" effects the masking and the signal "0" effects the release of the respectively corresponding bit place. Dependent on the signal M-INH, thus the masking function is either suppressed—all signal lines carry the signal "0"—or is executed. Given masked functioning, i.e. given the signal M-INH=0, the signals offered via the OR elements O are forwarded. These can be optionally derived from an externally supplied bit structure mask EXT-BIT or from the bit structure mask residing in the mask register M-REG. Over and above this, there is the possibility of generating an inhibit signal M by means of the selection switch MUX-M dependent on control signals CMD in combination with the flip-flop M-FF, said inhibit signal M being forwarded via the OR elements O and the AND elments U to all output lines of the mask controller M-ST and therewith completing a disabling of both masks A-MASK and B-MASK, so that the offered operands cannot be processed by the ALU. This inhibit signal can be derived, in sequence, from the existing hit signal T, from a bit of an external byte mask EXT-BYT, or from the individual bits of the bit structure mask offered in the mask register M-REG. The mask control thus opens a plurality of possibilities for masking, in that all logic units of the associative surface are uniformly or individually charged with a bit structure mask for the character to be processed and/or in that individual logic units are disabled in accordance with an externally prescribed or an internally derived byte structure mask.

The hit evaluation control T-AUSW monitors, in a traditional fashion, the hit signals T supplied by the individual logic units ALV of the associative surface ASS-FL in order, on the one hand, to identify the hit signals T in sequence and, on the other hand, to identify the total number of hits per check, for example when sorting.

For identification and addressing, the hit evaluation control T-AUSW can, analogous to the figure from Electronics, August 17, 1970, page 100, consist of a respective flip-flop for the intermediate storage of respectively one of the hit signals, of a following priority network and, under given conditions, of a "1-of-n" decoder. For the determination of the number of hits, the signal outputs of the flip-flops are connected parallel to an adder network which, under given conditions, is followed by a comparator for the derivation of the sum signals 0, =1 and >1. Another embodiment with counters instead of an adder network is shown in FIG. 5 of the initially cited DE-OS No. 32 16 905.

The hybrid associative memory explained up to now can thus handle the following tasks:

1. Data units can be accepted into or taken from the basic storage in individual succession, whereby lists of the datasets contained in the basic storage are kept with the memory regions assigned to them.

2. All characters of a horizontal character level leve of the basic storage can be simultaneously connected through to the associative surface or be accepted by it in the form of result register contents.

3. Different associative procedures can be executed dependent on control instructions and parameters offered in continuous sequence.

4. The procedures to be executed can consist of prescribed instruction sequences for the execution of association relations and logic operations in mixed succession and of hit-dependent instructions of various types.

5. Information contained in the result registers of the logic units in the associative surface can
    (a) be simultaneously transmitted into the various registers of the same logic unit for all logic units of the associative surface,
    (b) be simultaneously output via the data line system from the logic units of a respective memory group or
    (c) be simultaneously transferred for all logic units of the associative surface into a prescribed horizontal character level of the basic storage and can again be made available therefrom to the associative surface, for example the mask registers.

Deriving on the basis of these general control possibilities are a plurality of possible operational sequences for the evaluation of the hit signals;

1. On the basis of the hit signals T of the associative surface ASS-FL, the data units corresponding to the indicated hits can be selected addressed fashion and rolled out of the basic storage B-SP.

2. An immediate transfer of the respectively obtained hit signals to a higher-ranking control is not always desired. The hit signals of the entire associative surface ASS-FL can therefore first be intermediately stored in a prescribed byte slice BS of the basic storage B-SP. For this purpose, after the execution of an association relation and intermediate storage of the obtained hit indications TA in one of the flip-flops PH-FF . . . (FIG. 11), the operand register A-REG is first loaded with an external operand EXT-OP which comprises only a single bit place having the value "1" per byte. Furthermore, the other operand register B-REG is loaded with the character 0000 0000 or a hit character from the basic storage B-SP. Both operands are combined in the ALU by means of the functions "AND" or, respectively, "OR" and the result pattern appearing at the output of the ALU is accepted into the result register C-REG with the signal TÜ dependent on the stored hit, and is transmitted from said result register C-REG into the basic storage B-SP as a hit character.

Hits from successive procedures can thus be collected and supplied for a later interpretation in that respectively the same bit place of a hit character is overwritten or, on the other hand, one of the eight bit places of the hit character which are available in the present case is assigned to the individual hit signals of the successive procedures.

3. The formed hit characters are employed as masks, whereby they are directly accepted out of the result register C-REG or out of the basic storage B-SP into the mask register M-REG of the corresponding logic units in the associative surface, so that individual masks are available for the individual logic units AVL . . . as a bit structure mask or as a byte structure mask.

4. Independently of the possibility cited under point (2), the logic results given occurring hits can be transferred from the output of the ALU directly into one of the result registers C-REG.

5. For the execution of similarity evaluations of the bit patterns embodied by the characters with evaluation of the individual bits of the character, a hit pattern is generated at the output of the ALU with the ALU function "EQUAL". The indicated bit hits are added up by the checksum generator Q-SUM at the output of the ALU and the result is intermediately stored in one of the result registers C-REG in the form of a binary number. By means of additionally inserted control operations, the achieved result after every similarity check can be added to a result of preceding similarity checks already existing in the result register, so that the individual bit sums of an entire procedure are obtained, for example for the similarity check of character strings. The results can also be respectively deposited in a prescribed byte slice of the basic storage B-SP. This also enables a later interpretation, for example a sorting according to the degree of similarity.

6. For weighting hit signals T after an executed association relation, weighting operands successively readied in the operand register A-REG are added by the ALU to a result already present in the result register C-REG and the new weighting result is stored, whereby the hits can be weighted with different weightings. The weighted sums formed in such manner can, for example, be employed for the similarity evaluation of character strings with respect to a search argument. In this case, too, the weighting results can be stored in a prescribed byte slice BS of the basic storage B-SP.

7. The number of simultaneously occurring hits T can be identified by the hit evaluation control T-AUSW of the associative surface ASS-FL in the form of a binary number. This enables similarity interpretations of individual byte slices or groups of byte slices from the basic storage and can be exploited for sorting operations.

The search arguments respectively required for the association relation can, as already explained, be offered from various sources in the operand register A-REG. The characters of a byte slice BS of the basic storage B-SP can also serve as search arguments, so that these can be compared to or combined with an arbitrary number of other byte slices of the basic storage.

Overall, the associative surface designed in such fashion in combination with the specially designed basic storage produces a hybrid associative memory with a hitherto unachieved, universal applicability and performance capability combined with nearly unlimited storage capacity which is suitable for the greatest variety of tasks.

One of these possible tasks consists of a searching of data on the basis of prescribed search arguments from the datasets stored in the basic storage which shall be explained in greater detail below with reference to FIG. 13 and FIG. 15.

As shown in FIG. 13, let the search argument ARG be composed of a plurality of characters, for example A through L, and be present stored in a parameter memory, PAR-SP (FIG. 24). In this case, a check is to be performed for respective equality between the respectively valid search argument character and the data characters offered from the basic storage, this being communicated to the ALU (FIG. 10) of all logic units ALV ... of the associative surface ASS-FL by means of a control instruction corresponding to the function "B-A".

Before, however, the search operation can be started, at least the start addresses for the basic storage B-SP and for the parameter memory PAR-SP must be offered. On the basis of these start addresses, the two memories are selected at the beginning of the search operation and the respective first characters of the parameters and those of the data sequences to be simultaneously checked are loaded into the registers of the individual logic units ALB .... The offered association instruction is then executed and the hit evaluation T-AUSW checks whether at least one hit T ... exists for one of the data sequences. When this is not the case, then the search operation begins anew, namely with the respective first character of the parameter PAR and with a sequence start address for the basic storage which is modified by one character step in comparison to the original start address.

FIG. 13 shows a schematic illustration of the allocation of, for example, data sub-sequences consisting of respectively 256 characters of which, however, only two are illustrated, namely the data sub-sequences DF0 and DF1. The search argument ARG consists of the character string A through L, which, distributed in the illustrated fashion over the two data sequences DF0 and DF1, is contained in the dataset to be checked and is to be searched.

With the beginning of the search operation, the first character A of the search argument ARG is made available to all logic units of the associative surface as search bit pattern SBM and the first characters of the data sequences are simultaneously checked. In the present, assumed example, the result is negative and the search operation is started anew, in that, given an unalterred search bit pattern corresponding to the first character A of the search argument ARG, the second characters of the data sequences, etc., are now checked until a hit is registered at the 252$^{th}$ character of the data sequences. Accordingly, the hit chaining is activated, this being indicated with an arrow T-KET and the search bit pattern SBM is subsequently sequentially altered in accordance with the prescribed search argument ARG with every character of the data sequences to be subsequently checked.

When a hit report should happen to fail for all data sequences in the framework of further checking, then the search operation would have to begin anew. In the present case, however, the hit chaining is not broken off. However, the end of the data sub-sequences is reached with the last character E of the data sequences DF0, this being recognized, for example, by means of reaching the end of the memory or the prescribed and end address for the memory region in the basic storage B-SP which is to be checked. As indicated by the arrow T-UM, the hit chaining is switched and the search operation is continued with the original start address for the basic storage given a continuous character string of the search argument ARG. In accordance with the data chaining arrow between the first character F of the data sequence DF1 and the last character E of the data sequence DF0, the hit chaining for the data sequence DF0 is thus switched to the first data column.

In order to illustrate the latter, a part of the individual hit controllers T-ST is shown in the upper part of FIG. 13 based on FIG. 11 and the linkage for the transfer of the hit indications TA to the chaining control of the respectively neighboring logic means ALV is indicated, so that, after the switching, the hit indication TA1 leads, for example, to the hit signal T0 as though the search were being continued in the first data column for the data sub-sequence DF0.

Another possibility of hit chaining when reaching the end of the data sub-sequences to be checked is shown in FIG. 14, according to which the hit chaining is relocated into the hit evaluation control T-AUSW which monitors the associative surface ASS-FL. Every hit line, for example T0 through T63, of the associative surface thereby has a flip-flop allocated to it, said flip-flop being selected analogous to the hit flip-flops PH-FF in FIG. 11 via logic network TV-N and being capable of being conditionally or unconditionally set dependent on signals $S/R_{BED}$. Together, these flip-flops form a cyclical shift register T-SREGm so that the hits chained in a flip-flop can also be chained with the following hits of the cyclically following data sub-sequence by means of displacement with a shift clock K-CL by respectively one step when reaching the end of the data sub-sequences in the framework of a search operation without a switching within the individual logic means ALV with the required cross-connections being required. A plurality of data sub-sequences can thereby be covered by one search argument without further ado. In order to be able to find the memory start for the located data more easily at the end of a search operation thereby successfully concluded, the number of shifts is counted by a counter KZ and, under given conditions, is offered in the form of an address K-AD.

When the hit chaining finally reaches the end of the search argument ARG, then that means the successful conclusion of the initiated search operation, this being indicated by the arrow END.

Figure 15:
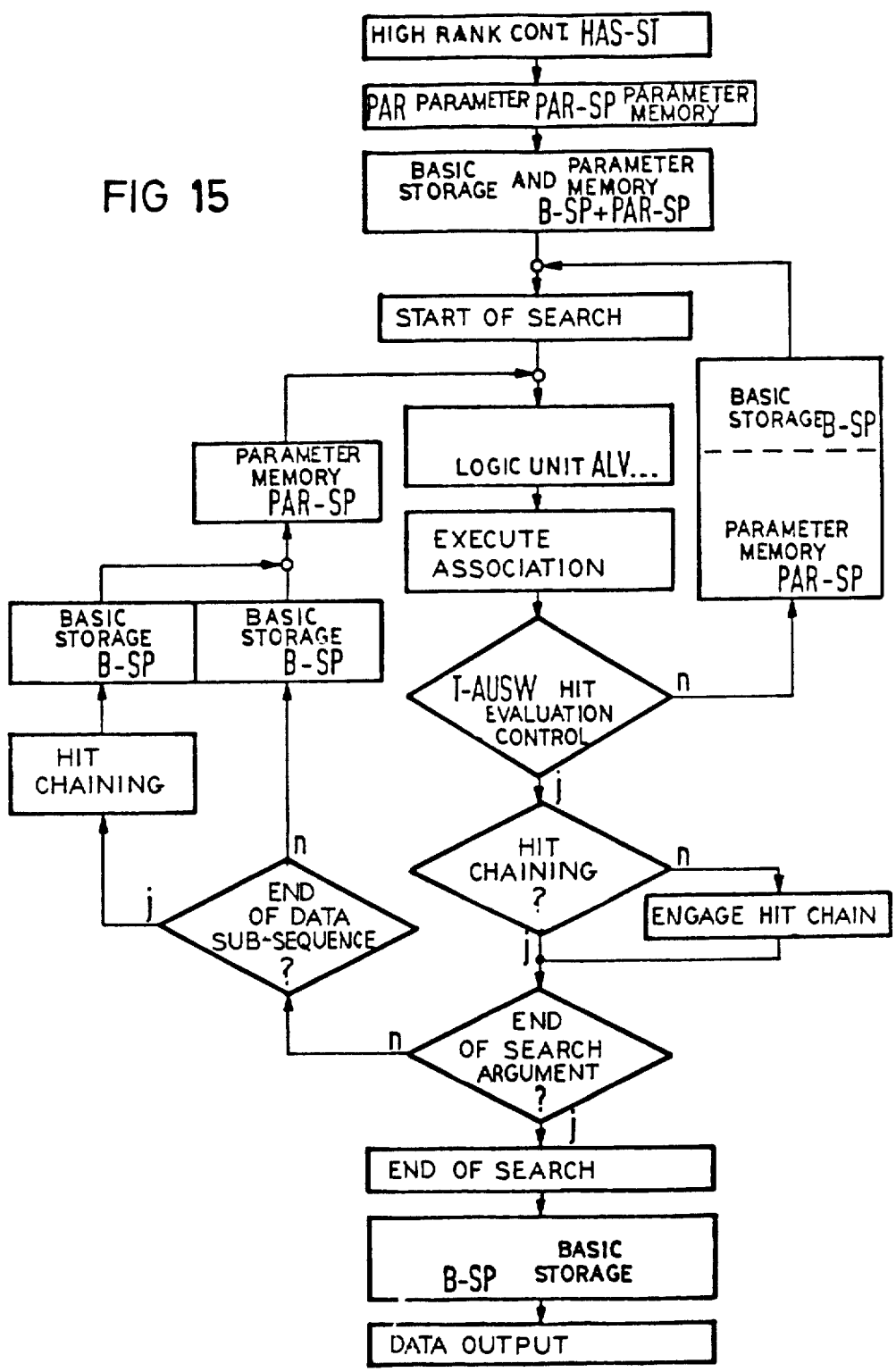
FIG. 15 is a flow chart for explaining the method of searching data in a hybrid associative memory.

In the flow chart of FIG. 15, therefore, the right-hand return loop is always traversed when a hit is not reported for any of the checked data sequences. This respectively leads to a renewed start of the search operation with the beginning of the search argument ARG given a shifted, new starting point for the data sequences as though the first character of the search argument ARG were being shifted along the data sequences DF ... step-by-step. The search argument is expanded character-by-character only when the starting point has been fixed on the basis of a hit, being thus expanded either until the hit chaining breaks off or, on the other hand, when the end of the search argument is reached. This expansion of the search argument is assured by means of the second return loop from the left in FIG. 15. Should the end of the chained data sequences be thereby reached, then the first return loop from the left functions instead.

Another task that is frequently raised consists of sorting datasets. The new sorting method explained below which is matched to the hybrid associative memory of the invention is based on the sorting method already disclosed by the DE-LP No. 23 42 660 and developed further in the European application No. EP-A2-0035787.

According thereto, the respective sorting bit pattern SBM is made available in the form of a multi-place binary character and is developed bit-wise dependent on the plurality of hits identified in every search run and of the respectively valid, last significant bit LSB. FIG. 16 shows the corresponding sorting alogrithm in the form of a table having the three columns "T=?⇌ for the number of hits, "LSB=?" for the last significant bit and "SBM change" for the development of the sorting bit pattern given forward and given reverse sorting.

Two hit cases are to be distinguished overall, namely more than one hit and no or, respectively, one hit. For the case in which a plurality of hits are present simultaneously, the last significant bit LSB is without significance. In any case, the most recently determinant sorting bit pattern is expanded by means of opening the mask by a further bit place by appending a 0 given forward sorting and by appending a 1 given reverse sorting. The last significant bit LSB is an additional determining factor in the other hit cases, no hit or one hit. When the last significant bit LSB is a 0, then this becomes a 1 by means of inversion given forward sorting or is simply deleted by means of constricting the mask given reverse sorting. When the last significant bit LSB, however, is a 1, then this is deleted given forward sorting or, on the other hand, becomes a 0 by inversion given reverse sorting.

FIG. 17 shows the execution of a corresponding sorting operation for three data A, B and C in the form of a table having the columns "SBM" for the respectively effective sorting bit pattern, "LSB" for the last significant bit, "T" for the hit indication, "SBM change" for the change of the sorting bit pattern SBM to be undertaken, and "Output" for the output of the data in sorted sequence.

At the beginning of a sorting operation, the sorting bit pattern generator as a rule supplies a succession of binary zeros and all bit places except for the most significant are covered by the mask in order to thus arrive at hits as quickly as possible. Given the three data A, B and C to be sorted in the selected example, such a sorting bit pattern leads to a multiple hit indication. The sorting bit pattern is therefore to be expanded by means of attaching a 0. A multiple hit is likewise indicated given the next check and a further 0 is appended by means of opening the mask. The third check indicates a single hit, namely for the entry A, which can be output. Subsequently, the 0 at the last place is inverted and is thus changed into a 1, so that one hit is again achieved in the next check and the entry B can be output this time. Since the last significant bit LSB was a 1, one place is again deleted by means of constricting the mask. The following check does not yield a hit and the last significant bit is modified into a 1. Since the following check likewise does not produce a hit, the last effective bit is again deleted by means of constricting the mask, so that the effective sorting bit pattern SBM consists of a single 0 at the highest place. The check thereby also does not lead to a hit when all data that have already been sorted out are accordingly flagged, so that this 0 is inverted into a 1, which then leads to a hit for the last entry C.

The illustrated example treats a very simple executing sorting operation wherein the sorting bit pattern SBM is expanded only once over a number of bit places and is then constricted again. In practice, however, one must count on a constant alternation between expansion and constriction of the sorting bit pattern SBM to different degrees.

The flowchart of FIGS. 18A through 18C shows the execution of a sorting operation according to the method of the invention given vertically stored character strings of a datum. The sorting bit pattern field SBM for three bytes 1 through 3 is shown at the top of FIG. 18A above the actual flowchart, whereby respectively four bits from one byte for the sake of simplicity. Complete bytes separated by a byte boundary, for example BG1 and BG2, are separately stored and only the respective byte BYTE 2 which is partially incomplete and is adjacent to the last valid byte boundary, for example BG1, determines the progress of the sorting operation.

The flowchart is divided into six columns, namely one for the identification of the selection runs AWL for searching a datum identified by a single hit, one for the search runs SL for tracking down hits, one for the search bit pattern SBM employed, one for character single hits $T_E$ and one for the overall number of hits $T_{GES}$ per search or selection run SL or AWL.

In the first search run SL1, the sorting bit pattern consists of a 0 at the most significant bit place and several hits derive in the first check of the respective first characters of all data. This is also true of the search runs 2 through 4. At the end of the search runs SL4, therefore, the byte boundary BG1 of the sorting bit pattern must be crossed. The byte BYTE 1 is thus complete and must be intermediately stored, whereas the second byte BYTE 2 is to be developed further as a new, current byte.

Before, however, a check on the basis of the current byte of the sorting bit pattern SBM and the corresponding second character of all data can be executed, the first character of every datum must be respectively checked with the stored, first byte of the sorting bit pattern and only when a hit is thereby achieved is a subsequent check of the second character of the same datum meaningful with the current byte of the sorting bit pattern because coincidence with the overall sorting bit pattern SBM developed up to this point can only be given then. In the fifth search run SL5, therefore, this execution is indicated for each datum 1 through n of the file listed in the column DAT. This pre-condition is met for the data DAT1 and 5. A multiple hit indication therefore derives at the end of the search run SL5. The current byte of the sorting bit pattern SBM is thus to be expanded with another 0 at the second place in the second byte BYTE 2 and defines the search run SL6 which, moreover, sequences in the same way as the search run SL5. A single hit is indicated at the end, so that the datum DAT 1 to be sorted out is identified with an unalterred sorting bit pattern in a first selection run AWL1 and can be output first, this being indicated at the right-hand margin of the flowchart in FIG. 18A with AUS1.

The sorting operation is continued as specified in analogous fashion, this being only shown in the flowchart up to and including the fifth selection run AWL5.

The selected example of FIGS. 18A through 18C is restricted to crossing only one byte boundary BG1 of the sorting bit pattern SBM. It ought to be clear, however, that given an even greater expansion of the sorting bit pattern across a number of byte boundaries of all stored, complete bytes of the sorting bit pattern SBM must be consulted for checking in every search and selection run for each datum before checking with the respectively current byte of the sorting bit pattern in order to determine whether the required chaining condition is met up to the byte boundary preceding the current byte. With increasing expansion of the sorting bit pattern beyond a byte width, thus the number of additional checks per search run correspondingly increases and the search runs require increasingly more time since a read operation in the basic storage is necessary for every check.

This time can now be reduced in various ways One of these measures consists of the immediate abortion of the respective search run when a second hit occurs because a multiple hit indication is then produced and a new search run with an expanded sorting bit pattern will be necessary anyway. This is indicated in the flowchart of FIGS. 18A through 18C by means of the jump arrows AB at the right-hand margin of the flowchart.

Another measure consists, instead of aborting the search run after a second hit, of flagging the data identified by hits during a search run or of retaining the addresses of these data in a separate memory. All relevant data are thereby respectively acquired in a search run and only these data need now be taken into consideration in the following search runs. Unnecessary checks are thereby eliminated but all data in the basic storage must be selected even in the former case. In the latter case, the data can be respectively directly located on the basis of the intermediately stored addresses.

Also acting in the same fashion as the intermediate address storage is a separate auxiliary memory which is expediently integrated in the basic storage as a part thereof and which can thus help the existing associative surface when all data identified by hits during a search run are transferred into this auxiliary memory and are subsequently finally sorted out.

Since only a limited storage capacity which corresponds to a prescribed, highest number of hits during a search run can usually be provided for this auxiliary memory, a sorting bit pattern which effects a number of hits favorably filling the auxiliary memory is first determined in one or more search runs. The data identified by hits are transferred into the auxiliary memory only in a subsequent, separate transfer run. An overfilling of the auxiliary memory is impossible from the very outset in this fashion despite the limited storage capacity.

Independently of all of these measures for reducing the time for a sorting operation, the additional checks for the determination of the chaining condition for each datum of the file to be checked can be fundamentally largely avoided when an additional chaining element is exerted for every datum. Given an expansion of the sorting bit pattern beyond a byte width, this permits a statement regarding the observance or non-observance of the chaining condition up to the respectively valid byte boundary of the sorting bit pattern, which may therefore be accessed without additional checking.

The flow chart shown in FIGS. 19A and 19B based on that of FIGS. 18A through 18C shows the above-explained sorting execution upon consideration of individual chaining elements which are taken into consideration in an additional column "KG". The flowchart is also augmented by a further column "$T_K$" in which the hit $T_K$ resulting from the coincidence of individual hits $T_E$ and established chaining condition KG=1 is noted, this to be evaluated instead of the individual hit $T_E$.

The additional checks for the determination of the chaining condition are therefore eliminated in all illustrated search runs SL5 through 14 in comparison to the flowchart of FIGS. 18A through 18C given the expansion of the sorting bit pattern. The search operation is thereby fundamentally accelerated, as the comparison of the two flowcharts likewise shows.

The scope of the reduction of the time also depends on some marginal conditions in this case as well.

Thus, for example, the chaining statement in the individual chaining elements KG only retains its validity as long as a byte boundary in the reverse direction is not crossed in the framework of a constriction of the sorting bit pattern. Let this be shown with reference to FIG. 20 which shows three different data DAT1 through DAT3 of a file. Each datum respectively consists of four characters having the illustrated byte boundaries BG1, BG2 and BG3. All three characters coincide up to the second byte boundary BG2. The data DAT2 and DAT3 also coincide up to the byte boundary BG3. When the byte boundary BG3 is crossed in the framework of an expansion of the sorting bit pattern, then a positive chaining statement is still given only for the datum DAT1. When the sorting bit pattern is subsequently constricted again and the byte boundary BG3 is crossed, then the data DAT2 and DAT3 must again be involved in the ongoing sorting operation. A valid chaining statement for these data, however, no longer exists; it must therefore be redetermined.

Despite the individual chaining elements, the chaining condition must always be re-identified again given every crossing of a byte boundary of the sorting bit pattern. The checks required for the identification of the respectively valid chaining conditions can thus not be entirely avoided with individual chaining elements. The time required for this is different, however, depending on the type of selected chaining element and the type of chaining expression.

Given a 1-bit expression such as provided, for example, by a flip-flop, one cannot avoid first checking all data of the file that have not been sorted out characterwise on the basis of the intermediately stored sorting bit pattern down to the new valid, lower byte boundary after the reverse crossing of a byte boundary as in the method execution shown with reference to FIGS. 18A through 18C.

Given a more complex expression which, for example, concretely specifies the byte boundary of the sorting bit pattern which represents the valid chaining boundary independently of the degree of expansion of the sorting bit pattern and which requires a multi-place memory section in the form, for example, of a register or of a counter, only one check procedure per datum is required in the form of a comparison independently of the number of stored, complete bytes of the sorting bit pattern.

When, the byte boundary designated by the chaining expression coincides with the downwardly crossed byte boundary, then the chaining condition existed up to this byte boundary and the chaining expression is to be adapted to the new, lower byte boundary, for instance by means of reducing a corresponding identification number by 1. When no equality is given in the comparison, then the chaining was not given up to the downwardly crossed byte boundary. However, a chaining which existed up to the new, lower byte boundary is resurrected given a corresponding chaining expression.

Since, given such a complex chaining expression, no immediate control signal is given for the combination with the respectively achieved hit signal $T_E$, the chaining signal KG must be simulated in that, for example, a comparison of the individual chaining expression to the valid chaining expression is executed simultaneously with the check of the respective data character with the current byte of the sorting bit pattern and the acquired result signal is employed as chaining signal KG. As shall yet be shown, the comparison statements required therefor are derived in a simple fashion from the address registers and are offered by a control which monitors the sorting operation.

For the rest, the indications provided to the flowchart of FIGS. 18A through 18C also apply to the sorting method with individual chaining elements explained with reference to FIGS. 19A and 19B, namely the indications regarding abortion of a search run given an occurring second hit or, instead of this, flagging the data found by hits in a search run or, respectively, regarding the employment of an auxiliary memory, this being indicated in FIGS. 19A and 19B at the right-hand margin of the flowchart in the same way by the additional legends.

Figure 21:
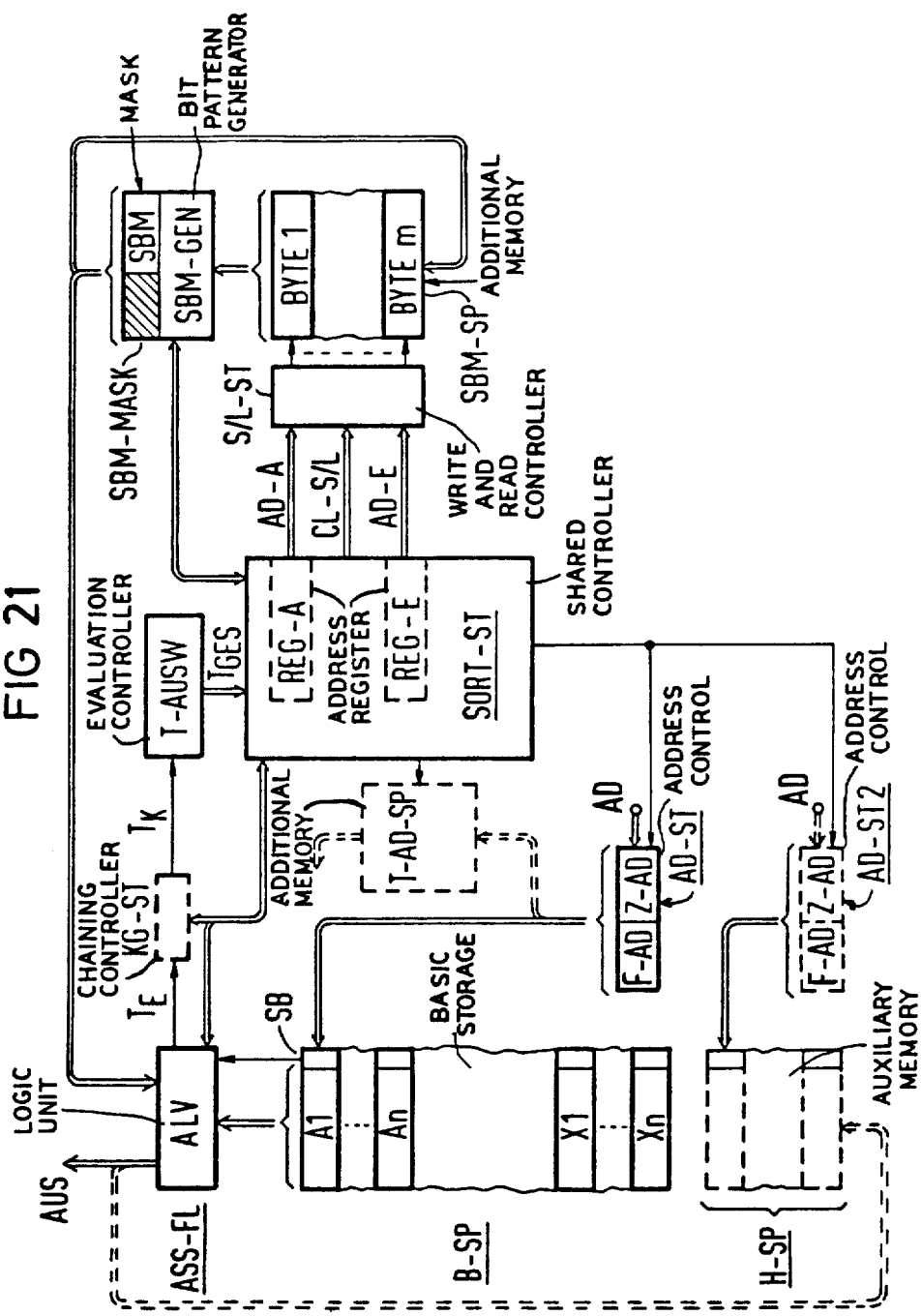
FIG. 21 is the fundamental structure of an arrangement for the execution of the sorting method according to the invention.

The execution of this sorting method partially requires an expansion of the hybrid associative memory described up to now. FIG. 21 shows a corresponding fundamental circuit diagram with a memory and evaluation part restricted to a single character column and having the data A through X of a file which respectively consist of a plurality of characters, for example A1 through An and are vertically aligned below one another. The offset distribution of the individual characters over a number of character columns has been left out of consideration for the sake of simplicity.

The most significant expansion consists of a shared sorting bit pattern generator SBM-GEN known from the German Letters Patent23 42 660 with mask SBM-MASK which offers the respectively current byte of the sorting bit pattern SBM that is supplied to the logic unit ALV. An additional memory SMB-SP with write and read controller S/L-ST is also provided in which the more-significant, complete bytes of the sorting bit pattern are intermediately stored, these being made available again to the sorting bit pattern generator SBM-GEN as needed.

Preferably two address registers are provided for the input and output control of the sorting bit pattern memory SBm-SP. REG-A is provided for readying the output address Ad-A as well as REG-E for readying the input address AD-E. These registers respectively indicate two different memory sections of the sorting bit pattern memory SMB-SP, namely for the most recently rolled-in, complete byte and for the following byte from the sorting bit pattern generator SBM-GEN which is no longer current when the next byte boundary is crossed, these being enabled by additional clocks $CL_L$ and, respectively, $CL_S$. By so doing, the contents of these registers can be used at the same time as reference values given employment of individual chaining elements with indications of the corresponding byte boundary and can be made available to a chaining controller KG-ST, as shall yet be shown.

The operational sequence when sorting this dataset contained in the basic storage B-SP (which may be seen from the flowcharts of FIGS. 18A through C or, respectively, FIGS. 19A and 19B) is assured by means of a shared controller SORT-ST coupled to the hit evaluation controller T-AUSW, and which supplies the respectively required control signals.

Also provided per datum or data character as well is a separate identification bit SB which, for example, in its set condition indicates the already accomplished sorting out and is conducted either via the logic unit ALV or directly to the controller SORT-ST in order to effect a diversion to the following datum. These identification bits SB are set in a known fashion at the initialization of the controller SORT-ST when sorting out a datum. This, however, is not shown in detail.

As also indicated in FIG. 6 with broken lines, either an additional memory T-AD-SP for the intermediate storage of the addresses of the data identified by hits during a search run or, on the other hand, an additional sub-region H-SP functioning as an auxiliary memory in the basic storage B-SP for the intermediate storage of the data identified by hits during a search run can be provided, this already having been explained in conjunction with FIGS. 18A through 18C and 19C.

A separate address controller AD-ST2 is expediently provided for the selection of the individual memory sections in the auxiliary memory H-SP. A buffer memory (not shown) is also required in the transfer path between the logic unit ALV and the auxiliary memory region H-SP since, as a rule, only one of the two address controllers is effective and only writing or only reading can be carried out.

Given employment of individual chaining elements per datum, an additional chaining controller KG-ST can be disposed between every logic unit ALV and the shared hit evaluation controller T-AUSW as an expansion of the hit controllers (FIG. 11) already provided in the logic units ALV, these likewise closely cooperating with the shared controller SORT-ST.

Such chaining controllers KG-ST are not required, however, for the method defined by the flowchart of FIGS. 18A through C, since the required chainings can be assumed by the hit controller T-ST (FIG. 11) of the logic unit ALV. Since, however, only one chaining element in the form of one of the flip-flops PH-FF in the logic units is available per column given the individual search runs through the relevant data block regions of the basic storage B-SP, the chaining condition must first be respectively newly produced after crossing the first byte boundary BG1 of the sorting bit pattern SBM.

The hit acceptance into the chaining element PH-FF dependent on a clock only triggered when a byte boundary is reached raises, however, a problem: When the last bit before reaching the byte boundary is a "0", then a determination cannot be made until the end of the search run as to whether the byte boundary is actually crossed, namely given a multiple hit, or whether the last bit is to be transformed into a "1" and, thus, the byte boundary is not yet crossed. If the 0 at the last place leads to a resetting of the flip-flop and if the byte boundary were subsequently not crossed, then the chaining expression would have been wrongly modified. This difficulty is avoided when the chaining condition is newly determined in a separate run even after the failure of a byte boundary crossing.

Figure 22:
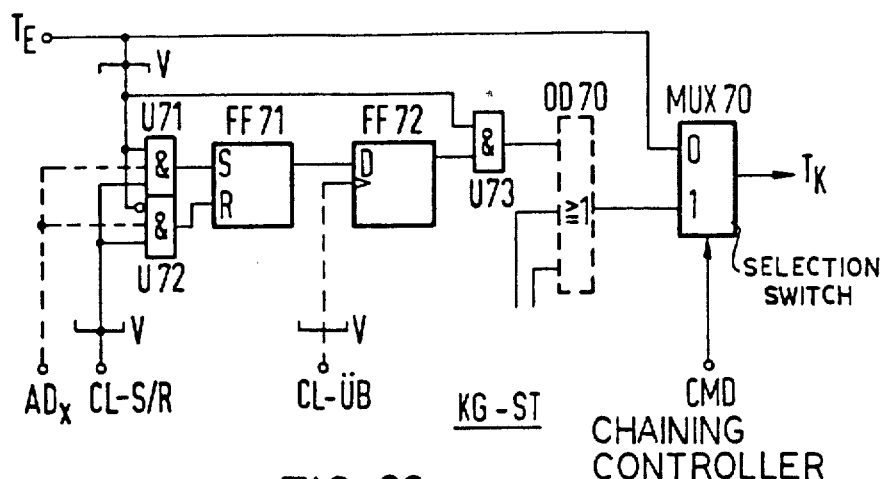
FIG. 22 is a fundamental circuit diagram for the chaining control upon employment of individual chaining elements for a one-bit expression.
Figure 23:
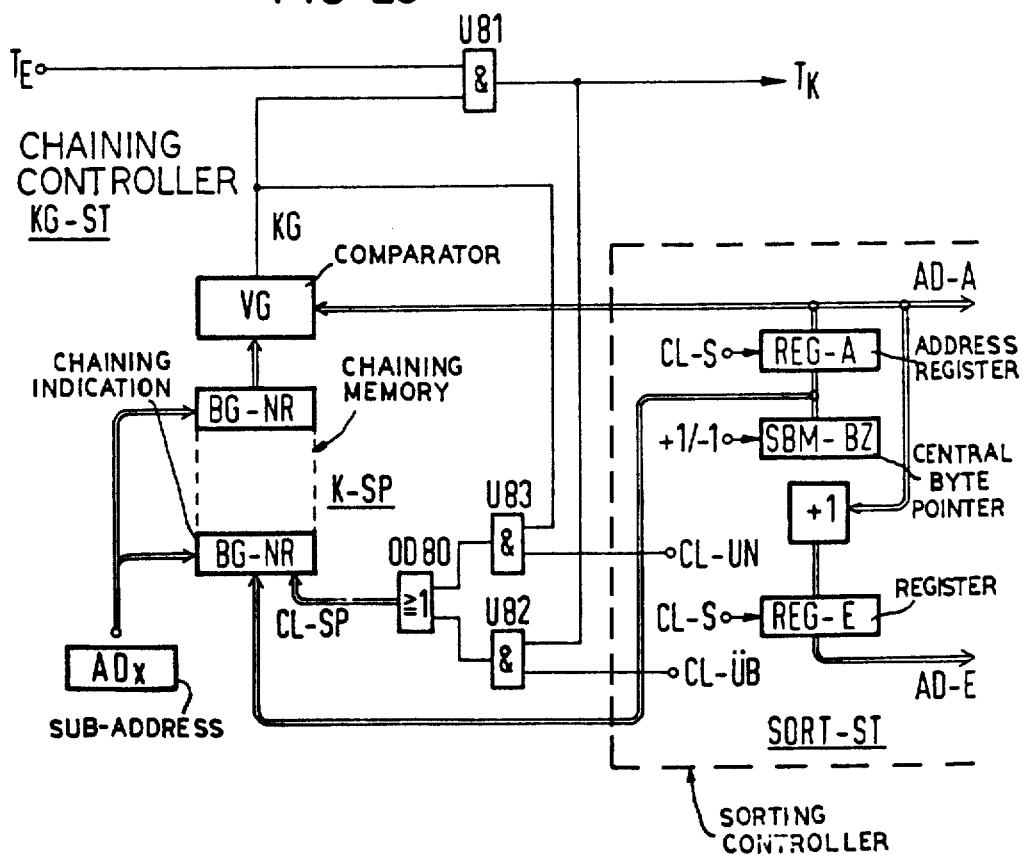
FIG. 23 is a fundamental circuit diagram for the chaining control given employment of chaining elements storing flags.

The byte boundary chaining, however, can also be displaced into the additional chaining controller KG-ST whose structure is shown in FIG. 22 or, respectively, FIG. 23.

Given the illustrative embodiment of FIG. 22, based on the hit controller of the logic units, a flip-flop FF71 serves as a chaining element which is set or reset in every check dependent upon the hit signal $T_E$ of the logic unit ALV via AND elements U71 and U72 in conjunction with a transfer clock pulse CL-S/R. This first flip-flop is followed by a second flip-flop FF72, for example a D-flip-flop, which is clocked with a signal Cl-ÜB derived from the coincidence of the conditions "byte boundary reached" and "multiple hit present" and which finally accepts the chaining status which is initially only intermediately stored in the flip-flop FF71.

When the flip-flop FF72 is set and, thus, the chaining condition is met up to the valid byte boundary, then the AND element U73 is selected given every following hit $T_E$ triggered by gthe current byte of the sorting bit pattern and, via the selection switch MUX70 correspondingly set with CMD after the crossing of the first byte boundary, the hit signal leads to the chained hit signal $T_K$. When, by contrast, the first byte boundary has not been crossed yet, then the individual hit signal $T_E$ is directly forwarded via the selection switch MUX70. Due to the additional flip-flop FF72, the separate search run given failure of an anticipated crossing of a byte boundary is eliminated in this case. Instead of the circuit combination comprising the AND elements U71 and U72 as well as the flip-flop FF71 as an S/R-flip-flop, a circuit arrangement comprising a D-flip-flop can also be employed.

The part of the chaining controller KG-ST described up to now likewise requires the prior checking of all affected characters of a datum on the basis of the intermediately stored bytes of the sorting bit pattern in order to produce the chaining condition, this already having been addressed in conjunction with the operational sequence explained with reference to FIGS. 18A through C.

The prior checking of all characters can, however, be eliminated according to the flowchart of FIGS. 19A and 11B when the components provided within the multiple terminals V in combination with the additional OR element OD70 shown with broken lines are multiply provided, namely individually for every datum of the file. Thus the selection ensues by means of the address-conditioned selection line $AD_x$ (shown with broken lines) parallel to the selection of the corresponding datum in the basic storage B-SP.

As already explained in conjunction with FIG. 20, the chaining condition must first be newly determined for all chaining elements given, however, every downward crossing of a byte boundary. This can then be executed character-by-character.

The expense, however, can be significantly reduced when, according to the illustrative embodiment of FIG. 23, a memory unit, for example a special chaining memory K-SP, is provided in the chaining controller KG-ST as an individual chaining element. This memory unit, for example, can store the number BG-NR of the byte boundary of the sorting bit pattern that represents the valid chaining boundary.

The corresponding memory unit in the chaining memory K-SP is selected with a sub-address $AD_x$ given every check of a data character from the basic storage B-SP and the chaining indication BG-NR contained therein is supplied to a comparator VG and compared to the address AD-A contained in the address register REG-A for the last intermediately stored complete bye of the sorting bit pattern SBM. Given coincidence, the comparator VG supplies a signal KG indicating the validity of the chaining, said signal KG being combined with the corresponding hit signal $T_E$ by means of the AND element U81 and, given the arrangement according to FIG. 22, it supplies the chained hit signal $T_K$.

When a byte boundary is crossed, this being likewise indicated with a signal CL-ÜB derived from the coincidence of the statusses "Byte boundary reached" and "Multiple hit present", then all data of the file to be checked are checked in an inserted modification run for the presence of the chaining condition given an unaltered current byte of the sorting bit pattern SBM. The corresponding chaining entry BG-NR in the chaining memory K-SP is then changed under given conditions, for example by being increased by a 1 when counting the crossed byte boundaries.

A central byte pointer SBM-BZ in the sorting controller SORT-ST is expediently employed for that purpose, the indication thereof normally coinciding with the content of the address register REG-A which is capable of being reduced or increased by a unit.

Given a crossing of a byte boundary, the address AD-A contained in the register REG-A as a comparative value is first retained and the byte pointer SBM-BZ is incremented by a unit in order to identify the new valid byte boundary. When the checking yields a positive chained hit signal; $T_K$, then the AND element U82 is initiated and the new chaining entry is accepted by the byte pointer SBM-BZ with the write instruction CL-SP taking effect at the output of the OR element OD80. Only at the end of the modificatin run and after roll-in of the complete current byte of the sorting bit pattern SBM in the memory SBM-SP is the content of the register REG-A then also matched to the content of the pointer SBM-BZ with the clock CL-S. The content of the register REG-E for the identification of the memory location for the new current byte for the sorting bit patter is correspondingly modified via a "plus-1" network +1 before the initiated sorting operation is continued.

The new chaining conditions given every downward crossing of a byte boundary (as indicated by the signal CL-UN of the sorting controller SORT-ST) can be far more easily identified than given the arrangement of FIG. 22, since only the chaining entries BG-NR in the individual memory sections of the chaining memory K-SP of the chaining controller KG-ST need be checked.

Next, the pointer SBM-BZ is decremented by one unit in this case without at first modifying the content of the register REG-A. The individual entries BG-NR in the chaining memory K-SP are then successively selected and again compared to the comparative indication AD-A in the register REG-A. Given coincidence, the signal KG of the comparator VG drives the AND element U83 and, via the OR element OD80 with the signal CL-SP, initiates the acceptance of the pointer reading into the respectively driven chaining element in the chaining memory K-SP as a new chaining entry. When there is no coincidence, the existing chaining entry remains unmodified, since no valid chaining had then existed up to the downwardly crossed byte boundary.

After checking all chaining entries in the chaining memory K-SP, the last stored byte of the sorting bit pattern SBM is then made available to the sorting bit pattern generator SBM-GEN from the memory SBM-GEN with the still unmodified address AD-A in the register REG-A, and only subsequent thereto are the contents of the registers REG-A and REG-E matched to the new reading of the pointer SBM-BZ with the clock CL-S and the sorting operation is continued.

Given the sorting method explained up to now, it was presumed that, in accordance with the DE-LP No. 23 42 660, the bit places not relevant for the sorting bit pattern in the framework of the working capacity of the logic unit existing for the execution of an association function, for example of eight bits per character, were eliminated from the respective check by means of a mask changing in width in the same fashion as the sorting bit pattern, for example SBM-MASK in FIG. 6. Thus the check is respectively restricted to only those bit places occupied by the sorting bit pattern, and a check for equality is carried out with the association function "EQUAL".

This suppression of the non-relevant bit places by a masking can, however, be eliminated when the association function "LESS THAN/EQUAL TO" or, respectively, "MORE THAN/EQUAL TO" is employed instead of the association function "EQUAL", the non-relevant bit places given the sorting bit pattern are all set to "1" or, respectively, "0", and the full, non-masked working capacity of the logic unit is employed for the check.

Let, for example, the following sorting bit pattern

01010|XXXX be given, whereby X indicates the non-relevant bit places. In the check for equality, hits derive which lie in the region between the two following values:

01010|0000 and

01010|1111.

When one wishes to sort data proceeding from the lowest rule of precedence ascending in rank, i.e. in an upward or forward direction, then one arrives at the same result when all of the non-relevant bit places are set to "1" and the check is executed with the relation "LESS THAN/ EQUAL TO" instead of the relation "EQUALITY". The analogous case applies to sorting in the inverse direction, i.e. in a downward or reverse direction, whereby all non-relevant bit places, however, are to be set to "0" and the relation "MORE THAN/EQUAL TO" is checked.

Particularly given employment of a universally functioning logic means for the execution of the association functions such as described, for example, with reference to FIG. 10, this presents no difficulties, yet avoids the otherwise necessary blanking of the non-relevant bit places in the check without the sorting procedure being otherwise thereby influenced.

Regardless of the type of checking, the method can also be used in simple fashion for searching the datum with the highest or the lowest value from a dataset of data having a different value or rank. When the datum having the lowest value is sought, then a sorting operation in the forward direction is executed beginning with the sorting bit pattern "00 ... 00" until a first sorting hit is achieved. When the datum with the highest value is sought, then the sorting operation ensues in the reverse direction, beginning with the sorting bit pattern "11 ... 11".

If the sorting operation is thereby not already terminated after the first sorting hit, but only after a prescribed plurality m of sorting hits, then one necessarily obtains m data having the m lowest or, respectively, the m highest values, namely in an ordered sequence.

A searching of data having values lying closest to a prescribed reference value is also possible in simple fashion with the sorting method of the invention.

When data whose values are either only lower or only higher than the reference value are thereby sought, then all data of the dataset to be checked are first checked in an elimination run with the reference value as the sorting bit pattern and those data whose values are greater than or, respectively, smaller than the reference value are flagged as sorted out. When one wishes to acquire the smaller value or values lying closest, then the elimination ensues with the association function "MORE THAN", otherwise with "LESS THAN". A sorting operation is then executed for the subsequently remaining data, whereby the starting point for the sorting bit pattern is again the prescribed reference value. When searchng for smaller values, the sorting ensues in a downward or reverse direction, in the other case it ensues in an upward or forward direction. The sorting procedure can thereby also be respectively terminated as soon as the first sorting hit when only the most proximate datum is desired or, on the other hand, only after m obtained sorting hits, when the m most proximate data are sought.

When, by contrast, the data having the most proximate value or, respectively values are sought regardless of the direction, then the possibility is available, in combination with an auxiliary memory, of executing two sorting runs of the above type for the identification of data having both greater as well as small value, of transferring the data thereby found into the auxiliary memory, and of alternately searching in the one and in the other direction by means of a step-by-step modification of the sorting bit pattern with the reference value as the initial sorting bit pattern until the first or the first m sorting hits are achieved.

FIG. 24, finally, shows the overall structure of a hybrid associative memory for large datasets comprising the components already discussed in detail above, whereby the sorting bit pattern generator SBM-GEN has been shown as a unit together with the mask and the memory for the complete sorting bit pattern bytes (FIG. 21) for the sake of simplicity. A separate illustration of the address re-ordering units and data re-ordering units in conjunction with the basic storage B-SP has been omitted.

Based on FIG. 8, the basic storage B-SP is three-dimensionally constructed of a plurality of memory groups MD0 through MD15 comprising four character columns each which are respectively connected by individual data paths to the corresponding logic unit ALV of the associative surface ASS-FL. This is indicated by means of vertically placed arrows of the line system HAS-BUS, so that 64 data characters in the form of a character or byte level BS can be simultaneously exchanged in the one or other direction. The data lines of respectively all character columns of a memory group, for example, MD0, can also be switched parallel to a correspondingly wide data path—indicated by means of the horizontal arrow with switch S of the line system HAS-BUS—so that respectively four characters can be exchanged as a data unit with the periphery (not shown) given the normal memory mode. A buffer memory P-SP, for example as shown in FIG. 9, is also coupled to this wide data path.

An auxiliary memory H-SP is also integrated into the basic storage B-SP, this accepting the data sorted out from the remaining parts of the basic storage for final sorting, and its storage capacity per vertical character column corresponds to the scope of the largest datum of a data entry that is the determining factor for the sorting. The data of 64 different pre-sorted data entries can thus be checked in parallel and finally sorted.

For the transfer of data identified by hits in the framework of a search run from the basic storage B-SP into the auxiliary storage region H-SP, the respectively read datum from a data block, for example DB2, is first transferred into a buffer memory B-SP connected to the line system HAS-BUS and is subsequently written into the auxiliary memory H-SP and is allocated to a respectively free column region. Free column regions in the auxiliary memory region H-SP are thereby always filled independently of the position of the individual datum within the individual character columns 0 through 63. The allocation of the respective free column region ensues by means of an autonomous part of the address controller AD-ST. Four data characters united to form a data unit are always simultaneously transported in such re-storing in the present case, just as in the traffic with the line system HAS-BUS.

A separate parameter memory PAR-SP is provided for the parameters PAR which are required for the processing of the data by the associative surface ASS-FL, said parameter memory PAR-SP being constructed and organized in the same fashion as the basic storage B-SP but with the difference that only one memory group comprising one respective character column per parameter type, for example search argument characters, bit structure mask, external operand, or weighting factor, is required as a consequence of the identical charging of all logic units ALV . . . of the associative surface with uniform parameters. The respectively required group of parameters is thereby always offered in the form of a data unit, being thereby offered with a uniform memory address given every selection.

The memory instructions and addresses CMD-ST required for the readying of the parameters PAR and the selection of the data in the basic storage B-SP as well as the respectively required control instructions CMD-ST are supplied, for example, by a higher-ranking control HAS-ST in which the controller SORT-ST of FIG. 21 is also integrated and which functions in accordance with the given methods.

The modules required in accordance with the invention for the hybrid associative memory can be constructed of commercially available components in a simple fashion at the command of an average person skilled in the art. Thus, for example, the basic storage B-SP can be composed of memory elements HYB 4164-2 of Siemens AG which comprise 64,000 1-bit units, whereby at least nine memory elements connected in parallel supply 64,000 available, individually selectable memory units comprising respectively eight data bits and one sorting bit.

The arithmetic-logical unit ALU can, for example, be constructed of the module SN 74S 181 and SN 74S 182 of the Texas Instruments Company.

The analogous case holds for the other components required, for which, for example, the following modules of Texas Instruments can be employed:
Remaining memories: SN 74S 189 with 16×4 bit
Binary counters: SN 74 163 with four binary places
Demultiplexers: SN 74 156, SN 74 138, SN 74 154
Multiplexers: SN 74 157, SN 74 153, SN 74 151
Adders: SN 74 82 and SN 84 83
Priority encoder: SN 74 148 or SN 74 147

In order to obtain components having the respectively desired number of inputs and outputs, these modules are to be combined with one another in the respectively required form.

Although various minor changes and modifications might be proposed by those skilled in the art, it will be understood that I wish to include within the claims of the patent warranted hereon all such changes and modifications as reasonably come within my contribution to the art.

I claim:

1. A hybrid associative memory, comprising:
   (a) a non-associative basic storage means for storage of at least one group of data units wherein every data unit is subdivided into a constant plurality of data sub-units, the basic storage means being divided into data unit sections each formed of data unit sub-sections, the data unit sections storing the data units and the data unit sub-sections storing the data sub-units, the data unit sections being arranged vertically and being separated into a plurality of areas such as that each area has a plurality of the data unit sections associated therewith, the data units compared to one another within each area having respectively corresponding data sub-units, and said basic storage means having an offset storage of said data sub-units such that for adjacent data unit sections in each area, the respectively mutually corresponding data sub-unit of one data unit is laterally offset with respect to the mutually corresponding data sub-unit of the data unit lying vertically adjacent;
   (b) addressing means connected to the basic storage means for creating respective area addresses for addressing the areas, for creating data unit section addresses for addressing data units in the data unit sections, and for creating selection addresses derived from the data unit section addresses for addressing data sub-units in the basic storage sub-unit sections;
   (c) selection means connected with the addressing means for selection of a memory operating mode and, given a normal memory operating mode, for setting the addressing means for simultaneous selection of data sub-units of a given data unit, for in an alternate memory operating mode for selecting a set of said mutually corresponding data sub-units from said unit sections in a given area;
   (d) re-ordering means connected to the basic storage means and addressing means for changing a sequence of the data sub-units of a respective data unit to be stored or to be read at least given said normal memory mode in order to recover a proper sequence when reading, or for producing a sequence required for ordering of the data sub-units in the memory with a determinant data unit section address for one of the data unit sections in a respective area;
   (e) an associative surface connected to outputs of the data re-ordering means and comprising a plurality of logic units corresponding to the plurality of data sub-units that can be simultaneously read out from the basic storage means for a simultaneous associative check of the individual data sub-units supplied from the basic storage means; and
   (f) a hit evaluation control means connected to and for sharing by all logic units.

2. A hybrid associative memory according to claim 1 wherein said addressing means and said re-ordering means in a normal memory mode store the sub-units respectively forming a data unit in the memory section of an area which is identified by the determinant address, and store the corresponding sub-units of this data unit of this area in cyclically offset fashion by a respective sub-unit section from data unit section to data unit section.

3. A hybrid associative memory according to claim 1 wherein said addressing means and re-ordering means in a normal memory mode store the respective, mutually corresponding sub-units of all data units of an area in the data unit section identified by the determinant address, and store the individual sub-units of every data unit cyclically offset by a sub-unit section from data unit section to data unit section.

4. A hybrid associative memory according to claim 1 wherein said address re-ordering means is controllable by the determinant address for the identification of a data unit section within a prescribed area and existing within the addressing means for control of a vertical offset in the area given selection of the individual sub-unit sections, said address recording means functioning as an address generator and supplying a separate selection address for each column of the sub-unit sections in the basic storage means for the selection of respectively one sub-unit section in a corresponding column so that only the determinant address for the identification of the desired data unit section within the corresponding area is required for simultaneous selection of the sub-unit sections respectively forming a desired data unit.

5. A hybrid associative memory according to claim 4 wherein a switching means is provided for changing said operating mode and which is coupled to the address re-ordering means so that dependent on the respective operating mode and the selected classification pattern for the individual data units in the area, either a uniform selection address for all columns for the selection of sub-units of the same data unit section or selection addresses different for all columns for the selection of vertically offset sub-units from different data unit sections can be offered.

6. A hybrid associative memory according to claim 1 wherein a single re-ordering means is provided for modification of the sequence of the sub-units within a respective data unit to be read or to be stored, and by selection switch means for control of the data flow path via the re-ordering means dpeendent upon a direction of data flow upon input or upon output.

7. A hybrid associative memory according to claim 1 wherein separate re-ordering means are provided for data flow given a normal and an associative memory mode.

8. A hybrid associative memory according to claim 7 wherein a re-ordering means is provided for the associative memory mode at result outputs of logic units of said associative surface so that a proper sequence is not produced until combinational results occur.

9. A hybrid associative memory according to claim 1 wherein a common re-ordering means is provided for normal and for an associative memory mode.

10. A hybrid associative memory according to claim 6 wherein the data re-ordering means is comprised of a plurality of distributor switches corresponding to a plurality of sub-units per data unit comprising a plurality of output groups corresponding in number to the plurality of sub-units for forwarding the sub-units or combinational results pending at said input to the output group respectively identified by the address determinant for the desired data unit section, and further comprising OR element means for combination of mutually corresponding output groups of individual distributor switches.

11. A hybrid associative memory according to claim 1 wherein a masking controller means is coupled to the addressing means for determination of the data units to be successively selected given associative search operations in a respectively desired combination.

12. A hybrid associative memory according to claim 11 wherein the masking controller means comprises a pre-settable address counter means for identification of a beginning of a selected memory region in the basic storage means; a pre-settable mask register means comprising one bit place per data unit section which monitors a selected basic storage region; a priority circuit means for monitoring the outputs of the mask register means and for generating corresponding sub-addresses in continuous succession with a memory cycle clock which forms the respective selection address for the basic storage means together with the sub-address offered by the address counter; and generating means for generating a loading signal for the re-loading of the address counter means and of the mask register means from an address memory after respectively all outputs of the mask register have been checked by the priority circuit.

13. A hybrid associative memory according to claim 1 wherein the basic storage means is formed of a plurality of memory groups respectively accepting a group of data units in respectively identical arrangement, selection means for the selective address selection of respectively only one of the memory groups and for simultaneous selection of all memory groups when writing or reading data units dependent on the operating mode, a shared address re-ordering means for a uniform addressing of the areas and sub-unit sections in the individual memory groups so that data units can be rolled in or read in individual succession given normal memory mode, a corresponding plurality of data units being respectively simultaneously connectible through to the associative surface by means of simultaneous selection of all memory groups given an associative memory mode.

14. A hybrid associative memory according to claim 7 including separate re-ordering means functioning in parallel for the data units per memory group for sequencing the associative memory mode, and a shared re-ordering means for the data units of all memory groups for sequencing the normal memory mode.

15. A hybrid associative memory according to claim 13 including a buffer memory formed of:
(a) a plurality of individual memories corresponding in number to the plurality of memory groups in the basic storage means with fixed allocation to the memory groups for loading and unloading the basic storage means so that every individual memory comprises a plurality of memory sections corresponding in number to the plurality of data units forming an area;
(b) first selection device means for successive selection of individual memories in communication with the basic storage means dependent upon an address of a respectively affected memory group;
(c) second selection device means for successive selection of the individual memories in communication with a data source successively supplying or accepting the data units; and
(d) shared selection device means for selection of the individual data unit sections in the individual memories in coincidence with the determinant address for the corresponding data unit section in a prescribed area of the basic storage means whereby, in traffic with the external data source, the individual memories are respectively completely loaded or unloaded before switching to the next data unit section, whereas in traffic with the basic storage means, given the respectively same address setting, the data units corresponding to one another in the individual memories are supplied in individual succession to the respectively corresponding memory group of the basic storage or respectively read out from the individual memory groups and are successively written into the corresponding individual memories so that the data units for a complete area level of the basic storage means are interchangeable in one operation given a data transfer between the basic storage means and the buffer memory.

16. A hybrid associative memory according to claim 15 wherein two buffer memories functioning in alternating operation are provided.

17. A hydrid associative memory according to claim 1 wherein said plurality of logic units of the associative surface comprise:
  (a) one single arithmetic-logical means having two operand registers and at least one result register for execution of both association relations as well as logic functions;
  (b) first evaluation means connected to the arithmetic-logical means for derivation of indicators from respective result signals, and second evaluation means for generating a hit signal by correlation of a respectively desired association relation with the indicators;
  (c) controllable masking means respectively disposed between operand input of the arithmetic-logical means and corresponding operand register; and
  (d) controllable selection switch means for connection of the operand registers to respectively required data sources.

18. A hybrid associative memory according to claim 17 wherein control signal generator means are provided for generating control signals corresponding to possible association relations from the indicators respectively made available and selection switch means for selection of one of the control signals as an individual hit signal dependent upon an association relation to be executed.

19. A hybrid associative memory according to claim 17 wherein said second evaluation means for generating a hit signal comprises chaining means for chaining individual hit signals from a plurality of successively or partially successively executed association relations when checking data sequences and for generating global hit signals when a chaining condition is met.

20. A hybrid associative memory according to claim 19 wherein selection switch means preceding the chaining means are provided for acceptance of individual hit signals of neighboring logic units so that hit signals can be accepted at an end of the data sub-sequence for chaining check results of chained data sub-sequences.

21. A hybrid associative memory according to claim 19 wherein the chaining means comprises at least one flip-flop and means for unconditional as well as conditional setting and resetting of the flip-flop dependent on individual hit signals in combination with corresponding control signals.

22. A hybrid associative memory according to claim 21 wherein the chaining means comprise a plurality of flip-flops corresponding in number to a working capacity of the logic unit, a first selection means for selection of one of these flip-flops dependent upon a control signal, and a second selection means for through-connection of the signal outputs of one of the flip-flops to a common output.

23. A hybrid associative memory according to claim 22 including a switch means connected to outputs of the flip-flops for forwarding stored hit signals to said at least one result register of the logic unit.

24. A hybrid associative memory according to claim 17 wherein a switch means is provided connected to the output of the arithmetic-logical element for forwarding the respective result thereof to said at least one result register dependent on presence of a hit signal.

25. A hybrid associative memory according to claim 17 wherein a check sum generator means is connected to the output of the arithmetic-logical element for formation of a check sum from a result of the arithmetical-logical element and by a switch means connected to the output of the check sum generator means for forwarding the result to the result register dependent upon presence of a hit signal.

26. A hybrid associative memory according to claim 17 wherein a register means is provided between an output and inputs of the arithmetic-logical unit for cyclical shift of bit places within a result of the unit which is to be formed.

27. A hybrid associative memory according to claim 25 wherein a register means is provided for cyclical shift and comprising a ring shift register connected to an output of the arithmetic-logical element and wherein outputs both of the ring shift register as well as of the check sum generator means are selectively connectible to the result register via said switch means.

28. A hybrid associative memory according to claim 26 wherein the operand registers of the logic units are designed as shift registers.

29. A hybrid associative memory according to claim 17 wherein, in addition to the two operand registers, the logic units comprise a mask register with a preceding selection switch means for supply of mask information from various data sources for internal control of the masking devices.

30. A hybrid associative memory according to claim 29 wherein a separate mask controller means is provided for selectively uniformly enabling the two masking devices for a masked or an unmasked functioning whereby given masked functioning, the bit structure mask contained in the mask register or an externally supplied bit structure mask is selectively offered by the mask controller means or the logic unit is blockaded based on a special control inhibit signal.

31. A hybrid associative memory according to claim 30 hwerein the mask controller means comprises a selection switch means for derivation of said control signal and whose inputs are connected to outputs of the mask register and to the hit signal line of its own logic unit as well as to a further external signal line so that said special control inhibit signal is optionally deriveable from an external inhibit signal, from the hit signal previously identified by the logic unit itself during execution of an association relation, or from a bit of the bit structure mask contained in the mask register.

32. A hybrid associative memory according to claim 31 wherein an additional externally loadable central mask register means is provided for enabling or disabling individual logic units of the associative surface with a respective information bit for each logic unit and individual signal lines to said individual mask controller means.

33. A hybrid associative memory according to claim 17 wherein gate circuit means are provided for simultaneously forwarding contents of the result register of all logic units of the associative surface into a data unit level of the basic storage means selectable by means of a uniform address and provided as an auxiliary memory, and being forwarded thereinto upon retention of individual allocation to the individual logic units.

34. A hybrid associative memory according to claim 1 wherein said hit evaluation controller means connected to all logic units of the associative surface comprises at least one flip-flop means for hit chaining per logic unit and these flip-flop means forming a shift register whose content, upon transition from one chained data sub-sequence to the following data sub-sequence to be checked by a different logic unit, is cyclically shiftable by one step in the corresponding direction in order to maintain the hit chaining, and wherein in a further memory means for identification of a total number of shift steps undertaken is provided for determining a memory start for data found at a conclusion of a search procedure.

35. A hybrid associative memory according to claim 1 wherein the hit evaluation controller means connected to all logic units of the associative surface hit identifier comprises means for identification of a number of hits indicated by all logic units during an executed association relation.

36. A hybrid associative memory according to claim 35 wherein the hit evaluation controller means comprises hit identifier means for identification of a total number of hits indicated by logic units of the associative surface during a succession of association relations.

37. A hybrid associative memory according to claim 1 wherein separately addressable auxiliary parameter memory means is provided for uniformly preparing different parameters for all logic units which are respectively required by the logic units of the associative surface for checking a supplied data sequence.

38. A hybrid associative memory according to claim 37 wherein at least some of the auxiliary parameter memory means for the parameters form a common memory which is organized with respect to a group of data units like the basic storage means and comprises address re-ordering units and data re-ordering units in the same fashion, whereby parameters of the respectively same type are externally offered in combined fashion as a sub-unit of parameter data units and are accepted in normal memory mode, and the various parameters required for each association relation in the associative mode are respectively simultaneously read and made available to the logic units.

39. A hybrid associative memory according to claim 1 wherein a sorting bit pattern generator means is provided for generating a sorting bit pattern respectively required when sorting data stored in the basic storage means depends on results of the hit evaluation controller means, an additional memory means for intermediate storage of units corresponding to a working capacity of the logic units given expansion of the sorting bit pattern beyond a byte width, as well as by identification bits per datum in the basic storage means for identification of data sorted out in a framework of a sorting operation and by devices for writing, reading, and monitoring the identification bits.

40. A hybrid associative memory according to claim 1 wherein an executive sequencing controller means is provided for execution of search and sort procedures and for offering respectively required parameters and control signals dependent upon results of the hit evaluation controller means.

41. A hybrid associative memory according to claim 39 wherein, in addition to chaining element means and chaining controller means integrated into the logic units of the associative surface, an additional chaining controller means is provided per logic unit and a separate chaining element is provided per datum of the file in the basic storage means which is to be checked during sorting.

42. A hybrid associative memory according to claim 41 wherein the separate chaining elements comprise a memory section means for a numerical identifier for an indication of a respectively valid byte boundary of the sorting bit pattern.

43. A hybrid associative memory according to claim 39 wherein individual marker bit means are provided per datum in the basic storage means for flagging data respectively identified by a hit during a search run, and by a monitoring control means for these marker bits for enabling a check by means of the logic units or for rerouting to a respectively following datum in the basic storage means.

44. A hybrid associative memory according to claim 39 wherein at least one additional address memory means is provided for intermediate storage of the addresses of data identified by hits of the logic unit during a search run and by means for transfer of the intermediately stored addresses for selection of the corresponding data in the basic storage means.

45. A hybrid associative memory according to claim 39 wherein the basic storage means comprises at least one separate memory region as an auxiliary memory having a capacity for a plurality of data corresponding in number to a total number of logic units of the associative surface for acceptance of data identified by hits of the associative surface from remaining regions of the basic storage means in a framework of a sorting procedure and for a following processing by the associative surface.

46. A method for searching data from data sequences or data sub-sequences stored in a basic storage of a hybrid associative memory, said data sequences or data subsequences being composed in an arbitrary combination of units of equal size as check units, being respectively allocated to a logic unit of an associative surface of the associative memory, and being searched on the basis of a prescribed search argument, comprising the steps of:

at a beginning of each search operation and proceeding from a prescribed starting step, checking mutually corresponding characters of all data sequences of data sub-sequences respectively parallel with a first character of the search argument by use of a respectively corresponding logic unit on the basis of respectively uniform parameters;

continuing this check along the data sequences until a hit is perceived;

when searching data comprising a plurality of units, activating a hit chaining of a corresponding logic unit with recognition of a first hit for one of the data sequences and checking all following characters of the corresponding data sequences with a respective corresponding continuous character of the search argument until either all characters of the search argument are worked off or a hit is no longer indicated for any of the checked data sequences;

given failure of a hit signal for all data sequences after activation of the hit chaining, aborting the respective on-going searching operation and initiating a new search operation with a start step for the basic storage which is shifted by one character in comparison to the previous start step; and repeating the interaction between initiation of a search operation and continuing if necessary checking with hit chaining until all data sequences have been checked with a respectively shifted search argument.

47. A method according to claim 46 given mutually chained data sub-sequences, including the steps of continuing the check in cyclical succession with beginnings of the data sub-sequences with respective attainment of the end of the data sub-sequences given a search argument proceeding beyond the end of the data sub-sequences; and chaining the hits respectively acquired up to an end of a data sub-sequence by means of the corresponding logic unit with the hits for a cyclically following data sub-sequence subsequently acquired by means of a neighboring logic unit.

48. A method according to claim 46 including the steps of:

searching data of aligned files stored in the basic storage of the hybrid associative memory dependent on rank assigned to the individual data composed in arbitrary combination of units of equal size;

assigning a respective group of data to a logic unit of the associative surface to which characters of the data are successively supplied so that a plurality of groups of data can be simultaneously checked character-wise by the associative surface;

checking the respective first characters of each and every datum in a first search run given a starting point for a sorting operation lying within the first byte of the sorting bit pattern, the checking occurring on the basis of respective uniform parameters and of the selected sorting bit pattern;

dependent on the overall number of hits of the search run, respectively constricting or expanding bit-wise the sorting bit pattern and under given conditions a mask for determination of the association region at a beginning of further search runs so that data found for sorting out during a search run are sorted out under given conditions and are flagged as such;

given expansion of the sorting bit pattern beyond the byte boundaries, intermediately storing the last respectively valid complete byte of the sorting bit pattern at every byte bountary crossing;

given a sorting bit pattern expanded beyond the byte boundary, successively checking all preceding characters of the datum to be respectively checked on the basis of the intermediately stored bytes of the sorting bit pattern in every search run before checking with the respectively current byte of the sorting bit pattern, and chaining the hits per character thereby obtained with one another; and only executing the check with the current byte of the sorting pattern when the chaining condition for the stored bytes of the sorting bit pattern is met for the datum to be respectively checked.

49. A method according to claim 48 including the step of respectively storing the chaining status existing given expansion of the sorting bit pattern at a crossed byte boundary in a chaining element allocated to the respective datum; only executing the checks during the search runs after every byte boundary crossing with the current byte of the sorting bit pattern, and evaluating hits deriving only in combination with a corresponding valid chaining indication; and given every downward crossing of a byte boundary of the sorting bit pattern, first newly identifying the chaining indicator for the new, valid byte boundary for all data in the corresponding chaining elements and only then continuing the search runs with the respective current byte of the sorting bit pattern.

50. A method according to claim 49 including the step of employing a numerical identifier of the respectively most recently valid byte boundary as a chaining indicator; given every downward crossing of a byte boundary of the sorting bit pattern, comparing the numerical identifiers of all data of the file in the basic storage which have not alredy been sorted out to the intermediately stored plurality of complete bytes of the sorting bit pattern and, given equality, decrementing the numerical identifier by a unit whereas the numerical identifier remains unaltered given non-equality; and evaluating hits deriving given the following search runs only in combination with a numerical identifier indicating the valid byte boundary to the current byte of the sorting bit pattern.

51. A method according to claim 50 including the step of deriving the numerical identifier for the respectively most recently valid byte boundary by central control registers from the individual data and from the respective comparison value for the byte chaining of the sorting bit pattern.

52. A method according to claim 48 wherein given the appearance of a second hit within a search run with the respectively current byte of the sorting bit pattern, aborting the search run immediately and expanding the sorting bit pattern.

53. A method according to claim 48 including the steps of flagging the data leading to hits during a search run; and given a plurality of hits achieved during a search run, taking into consideration only those hits deriving from flagged data in the following search run.

54. A method according to claim 53 including the steps of identifying the flagged data on the basis of the flags and subjecting only these data to a check.

55. A method according to claim 53 including the steps of separately intermediately storing the addresses of the data leading to hits; and identifying the data to be checked during the following search run or search runs and sorting it out on the basis of the intermediately stored addresses.

56. A method according to claim 48 including the step of identifying the data by hits during a search run, transferring it into an associative auxiliary memory, and flagging it in the basic storage as being sorted out; finally sorting the data transferred into the auxiliary memory and outputting it in the respectively same fashion by means of hit-controlled setting of the sorting bit pattern; initiating a new search run for the data store thereafter until all desired data have been sorted out.

57. A method according to claim 56 including the step of identifying the overall number of hits occurring during each and every search run and monitoring them for the observance of a prescribed value range; influencing the number of hits acquired given every new search run by step-wise adjustment of the sorting bit pattern on the basis of the respective previously identified number of hits such that said number of hits coincides with the prescribed value range; and only then transferring the data leading to a hit during a following search run with an unaltered sorting bit pattern into the auxiliary memory.

58. A method according to claim 56 wherein given employment of an auxiliary memory with only one datum per logic unit as storage capacity, providing an exchange of the data units between auxiliary memory and the logic units only given crossing of a byte boundary of the sorting bit pattern; aborting every search run reduced to a check procedure given a multiple hit and undertaking a new beginning with a new setting of the sorting bit pattern; and the data output as a consequence of single hits effecting a disabling of the corresponding logic unit.

59. A method according to claim 48 including the steps of employing an association function "LESS THAN/EQUAL TO" given forward to upward sorting or, "MORE THAN/EQUAL TO" given reverse or downward sorting instead of an association function "EQUAL" with masking of the non-relevant bit places of the sorting bit pattern; and given a prescribed working capacity for execution of the individual association functions by the logic unit, setting the bit places not relevant for the sorting bit pattern to "1" or "0" dependent on the sorting direction.

60. A method according to claim 48 including the steps of identifying individual data or a prescribed plurality of data from a dataset which have the highest or lowest value or values by executing a sorting procedure proceeding from a sorting bit pattern covering the full working capacity for the execution of association functions and having the initial value "11 ... 11" or "00 .. . 00" until a first or a prescribed plurality of sorting hits is achieved when sorting in a reverse or forward direction.

61. A method according to claim 48 including the steps of identifying individual data or a prescribed plurality of data having a value lying closest to a prescribed reference value by first checking all data of the dataset in an elimination run with the reference value as the sorting bit pattern, and dependent on a reference direction of the data to be identified, identifying as being sorted out all data whose value is lower or higher than the reference value; and only subsequently and proceeding from the reference value as the sorting bit pattern, executing the sorting procedure on the basis of the data not identified as being sorted out until a first or the prescribed plurality of sorting hits is achieved when sorting in forward or reverse direction.

62. A system for searching data from data sequences or data sub-sequences stored in a basic storage of a hybrid associative memory, said data sequences or data sub-sequences being composed in an arbitrary combination of units of equal size as check units, being respectively allocated to a logic unit of an associative surface of the associative memory, and being searched on the basis of a prescribed search argument, comprising:

means for checking at a beginning of each search operation proceeding from a prescribed starting step mutually corresponding characters of all data sequences of data sub-sequences respectively parallel with a first character of the search argument by use of a respectively corresponding logic unit on the basic of respectively uniform parameters;

means for continuing this check along the data sequences until a hit is perceived;

means for activating, when searching data comprising a plurality of units, a hit chaining of a corresponding logic unit with recognition of a first hit for one of the data sequences and checking all following characters of the corresponding data sequences with a respective corresponding continuous chracter of the search argument until either all characters of the search argument are worked off or a hit is no longer indicated for any of the checked data sequences;

means for aborting the respective on-going searching given failure of a hit signal for all data sequences after activation of the hit chaining and initiating a new searching with a start step for the basic storage which is shifted by one character in comparison to the previous start step; and means for repeating the interaction between initiation of a searching and continuing of necessary checking with hit chaining until all data sequences have been checked with a respectively shifted search argument.

* * * * *